(12) United States Patent
Patin

(10) Patent No.: US 10,439,812 B2
(45) Date of Patent: Oct. 8, 2019

(54) TECHNOLOGIES FOR PRIVATE KEY RECOVERY IN DISTRIBUTED LEDGER SYSTEMS

(71) Applicant: SquareLink, Inc., The Woodlands, TX (US)

(72) Inventor: Alexander Patin, Newtown, PA (US)

(73) Assignee: SquareLink, Inc., The Woodlands, TX (US)

(*) Notice: Subject to any disclaimer, the term of this patent is extended or adjusted under 35 U.S.C. 154(b) by 0 days.

(21) Appl. No.: 15/974,802

(22) Filed: May 9, 2018

(65) Prior Publication Data

US 2019/0245688 A1 Aug. 8, 2019

Related U.S. Application Data

(60) Provisional application No. 62/625,745, filed on Feb. 2, 2018.

(51) Int. Cl.
*H04L 29/06* (2006.01)
*H04L 9/08* (2006.01)
(Continued)

(52) U.S. Cl.
CPC .......... *H04L 9/0894* (2013.01); *H04L 9/0637* (2013.01); *H04L 9/0643* (2013.01);
(Continued)

(58) Field of Classification Search
CPC ... H04L 9/0894; H04L 9/3271; H04L 9/0637; H04L 9/0643; H04L 9/321; H04L 9/0869; H04L 9/3231; H04L 2209/38
See application file for complete search history.

(56) References Cited

U.S. PATENT DOCUMENTS

2003/0012386 A1 1/2003 Kim et al.
2004/0042620 A1* 3/2004 Andrews ............... H04L 9/0894
380/286

(Continued)

FOREIGN PATENT DOCUMENTS

WO WO-2017/155703 A1 9/2017

OTHER PUBLICATIONS

Zhao et al., "Lightweight Backup and Efficient Recovery Scheme for Health Blockchain Keys", Published Jun. 8, 2017, 2017 IEEE 13th International Symposium on Autonomous Decentralized System (ISADS), Bangkok, 2017, pp. 229-234 (Year: 2017).*

(Continued)

*Primary Examiner* — Chau Le
(74) *Attorney, Agent, or Firm* — Foley & Lardner LLP

(57) ABSTRACT

In an example system for private key recovery performed by a processor of a key recovery computing system, a key recovery computing system is configured to provide an original private key. The original private key is associated with a storage location of a blockchain-based asset. The key recovery computing system is configured to receive supplemental recovery information provided by a user via a user computing device. A recovery seed is derived from at least a subset of the supplemental recovery information, wherein the recovery seed is non-invertible. The original private key and the recovery seed are stored relationally to the supplemental recovery information. In some embodiments, the processor is further configured to cryptographically protect at least one of the original private key and the recovery seed via a universal second-factor authentication (U2F) device.

20 Claims, 26 Drawing Sheets

(51) Int. Cl.
H04L 9/32 (2006.01)
H04L 9/06 (2006.01)
(52) U.S. Cl.
CPC ............ *H04L 9/0869* (2013.01); *H04L 9/321* (2013.01); *H04L 9/3231* (2013.01); *H04L 9/3271* (2013.01); *H04L 2209/38* (2013.01)

(56) References Cited

U.S. PATENT DOCUMENTS

| | | |
|---|---|---|
| 2004/0249817 A1 | 12/2004 | Liu et al. |
| 2011/0106709 A1 | 5/2011 | Puura et al. |
| 2015/0262137 A1* | 9/2015 | Armstrong ............ G06Q 20/065 705/41 |
| 2016/0086180 A1 | 3/2016 | Candelore et al. |
| 2017/0048209 A1* | 2/2017 | Lohe .................. H04L 63/0442 |
| 2017/0078255 A1* | 3/2017 | Nejadian ............. H04L 63/0464 |
| 2017/0142090 A1* | 5/2017 | Mahaffey ............ H04L 63/0869 |
| 2017/0317824 A1* | 11/2017 | Brown ................. H04L 9/0894 |
| 2018/0323970 A1* | 11/2018 | Maron ................. H04L 9/0891 |
| 2019/0036692 A1* | 1/2019 | Sundaresan ........... H04L 9/0894 |

OTHER PUBLICATIONS

International Search Report and Written opinion for application No. PCT/US19/16425 dated May 7, 2019.

* cited by examiner

TECHNOLOGIES FOR PRIVATE KEY RECOVERY IN DISTRIBUTED LEDGER SYSTEMS

CROSS-REFERENCE TO RELATED APPLICATION

The present application claims priority to U.S. Provisional Patent Application No. 62/625,745, filed on Feb. 2, 2018, which is incorporated herein in its entirety.

TECHNICAL FIELD

The present application relates generally to technologies for private key recovery. In particular, the present application relates to improved private key recovery technologies for distributed ledger (blockchain) based systems.

BACKGROUND

A blockchain is a trustless, distributed ledger system supporting transactions between accounts. Blockchain entries consist of blocks of information that can include transactions, data records, and other information. For use as a distributed ledger, a blockchain is typically managed by a peer-to-peer network collectively adhering to a protocol for validating new blocks. Once recorded, the data in any given block cannot be altered retroactively without the alteration of all subsequent blocks. A blockchain includes multiple blocks, each containing data and a hash of the previous block, thereby linking the blocks in the blockchain. A typical block in a blockchain may hold a batch of transactions. Each transaction may include one or more data elements for storing information and a transaction ID to identify the transaction. The transactions are associated with a unique blockchain address, which serves as a pointer for locating and retrieving the transactions.

Public/private-key pairs enable user interaction with applications by allowing the user to access information stored on the blockchain with a private key generated specifically for the user. Thus, private key cryptography provides an ownership tool that fulfills user authentication requirements and allows the user to access the digital assets stored on the blockchain. Conventional private key management methods are inherently susceptible to hacking.

Conventionally, the user of the application is responsible for managing the user's private key and protecting it to prevent malicious parties from fraudulently acting on behalf of the user. The user is thus encouraged to keep the private key hidden and, should the user lose it, there is no conceivable way to regain access to the user's account. For example, one conventional key management mechanism is a non-custodial wallet, where the user manages the private key himself. Conventional non-custodial wallets require that users save and remember long private keys and/or multi-word random mnemonic passphrases in order to access user accounts/wallets. If the user loses or forgets the private key, any information encrypted using the private key is lost as well, such that any assets held by the conventional non-custodial wallet are irrecoverable. This requires extreme vigilance in maintaining the key. Additionally, this requires a high degree of sophistication on the part of the user, which may limit the adoption of blockchain-based technologies.

Another conventional key management schema involves the use of private key recovery phrases, which are system-generated mnemonics that are matched to a private key. Each word in the phrase matches to a series of bits that collectively make up the private key. The private key recovery phrases are easier to record and remember, but they are still not created by the user and are essentially alternative representations of the private key.

Yet another conventional key management mechanism is a conventional custodial wallet. Conventional custodial wallets are services that store and hide a user's private key and cryptographically sign transactions on the user's behalf. This allows for a more conventional account authentication and password recovery user experience, but the user does not have full control of his wallet account and the nature of the custodial wallet service makes user authentication information susceptible to security breaches. Additionally, in such conventional custodial wallet scenarios the entity maintaining the custodial wallet (and a user's private key) has the ability to access user information encrypted using the private key—meaning that a user must relinquish some level of control to the entity maintaining the custodial wallet. In many situations, this may not be desired if the user wishes to maintain complete control over their information. Custodial wallets further introduce a point of failure if the custodial wallet provider were to suffer a cybersecurity breach.

SUMMARY

The present invention overcomes many of the issues associated with conventional systems for utilizing private keys in distributed ledger systems, and in some embodiments provides a secure technology for private key recovery that truly maintains user control over information encrypted with a user's private key, as opposed to conventional systems wherein a third party or custodian may ultimately have control over a user's private key.

In an example embodiment, a key recovery computing system includes at least one processor, at least one memory module, and at least one software module. An example software module is structured to allow the key recovery computing system to generate and/or acquire data about digital assets (such as funds represented by electronic coins/tokens, etc.) and to store the data in a distributed ledger. In this context, the term "token" refers to a digital asset controlled by a user. Tokens may be blockchain coins that may not have value outside the blockchain system (such as, for example, BTC on Bitcoin™, ETH on Ethereum™, etc.). Additionally or alternatively, tokens may be backed by real-world assets, such that the token is a digital equivalent of a real-world asset like fiat currency, a precious metal, etc. The key recovery computing system may further include a software module structured to allow end user interaction with the computing system. For example, the software module may be structured to render user interface(s) to the user through a computing device of the user (such as a smart phone, tablet, desktop computer, wearable device, etc.). The user interface(s) of various embodiments are structured to allow the user to manage a digital wallet, create and store private keys, browse the user's digital assets, initiate funds transfers, etc. Additionally, one or more circuits of the key recovery computing system are structured to perform an automated computerized method for private key recovery.

In an example method for private key recovery performed by a processor of a key recovery computing system, the key recovery computing system is configured to provide an original private key. The original private key is associated with a storage location of a blockchain-based asset. The key recovery computing system is configured to receive supplemental recovery information provided by a user via a user computing device. A recovery seed is derived from at least a subset of the supplemental recovery information, wherein the recovery seed is non-invertible. The original private key and the recovery seed are stored relationally to the supplemental recovery information. In some embodiments, the processor is further configured to cryptographically protect at least one of the original private key and the recovery seed via a universal second-factor authentication (U2F) device.

In some embodiments, the key recovery computing system is configured to generate an original private key based at least in part on a hash of a user-specified user identifier and/or user-specified recovery information provided by a user. In some embodiments, the key recovery computing system may further comprise a processor configured to store at least a portion of the original private key (or the entire private key itself) in a blockchain transaction as a blockchain transaction data element. In some embodiments, the key recovery computing system may further comprise a processor configured to receive a copy of the user-specified user identifier and/or a copy of the user-specified recovery information from a computing device of the user. In some embodiments, the key recovery computing system may further comprise a processor configured to automatically generate a recovery private key based at least in part on a hash of the user-specified user identifier and/or at least a subset of the user-specified recovery information. In some embodiments, the blockchain-based computer system may further comprise a processor configured to derive an address of the blockchain transaction based at least in part on the recovery private key. In some embodiments, the blockchain-based computer system may further comprise a processor configured to identify the blockchain transaction based, at least in part, on the address. In some embodiments, the key recovery computing system may further comprise a processor configured to extract a portion of the original private key (or the entire private key itself) from the blockchain transaction data element. In some embodiments, the key recovery computing system may further comprise a processor configured to verify the identity of the user based, at least in part, on at least a portion of the original private key (or based on the entire private key itself).

In some embodiments, the hash is a first hash, the recovery information comprises a user-specified password, passphrase, PIN code, etc., and the processor is configured to generate a second hash of the user-specified password. In some embodiments, the blockchain transaction may be cryptographically protected using the second hash, and the processor may be further configured to receive a copy of a password hash of the user (for example, through a user interface) and decrypt the blockchain transaction using the password hash of the user.

In some embodiments, the processor is further configured to generate and provide to the user a recovery notification, which may contain the second hash. The notification may be an email, an SMS/text message, etc. In some embodiments, the processor is configured to await confirmation from the user that the recovery process should continue. If appropriate confirmation is received (in embodiments where this step is included), the processor is configured to receive a third hash of the password from the user through an interactive control included in the notification, such as a link. The identity of the user may be verified based, at least in part, on the third hash. In some embodiments, the processor is further configured to cryptographically protect (e.g., through encryption, a digital certificate, etc.) the recovery notification.

In some embodiments, upon verifying the user's identity, the processor is further configured to prompt the user for/receive new user-specified recovery information, which may be entered through the user interface. The processor is configured to create a new private key using a new hash of the user-specified user identifier and/or the new user-specified recovery information. In some embodiments, the processor is configured to associate the blockchain transaction with a new address associated with the new private key. In some embodiments, the processor is configured to sign the blockchain transaction using the new private key.

According to various embodiments, the user-specified recovery information may include any combination of a plurality of user-specified answers to a plurality of user-specified secret questions, digitized biometric information of the user, and/or subscription information provided by an account security service, which may be a part of or separate from the key recovery computing system.

In some embodiments, the processor is configured to augment the user-specified recovery information with a system-generated random number (such as a cryptographic "salt") prior to generating the original private key to enhance security of the private key.

According to various embodiments, all or some of the steps described above are steps in one or more processes/methods. According to various embodiments, certain steps of the processes and/or methods may be performed by any of the following: a key recovery computing system (which may include centralized or distributed storage, database(s), email server(s), text messaging server(s), etc.), a computing device of the user, a third-party system (such as a blockchain-based digital asset management system), etc.

As used herein, various terms used to describe exemplary embodiments of the present invention may be understood as follows:

"Assets" may be understood as any cryptocurrencies/tokens that a blockchain account possesses and/or any information stored in either blockchain transactions or central data stores associated with the account. Assets may or may not be encrypted by the account's key-pair. Assets may also be more generally understood as any information associated with a blockchain account and/or transaction, depending on the context of use.

"Blockchain Account" may be understood as a public/private-key pair with an associated blockchain address that may have transactions or other assets associated with it. Blockchain Accounts may also be more generally understood as any an form of account that provides access to a blockchain system and/or allows execution of blockchain transactions.

"Blockchain Address" may be understood as an indicator pointing to a key pair associated with an account—typically used for referencing or identifying a blockchain account. Blockchain Addresses may be more generally understood as any form of address and/or identifier used as a pointer and/or reference to a Blockchain Account and/or Blockchain Transaction.

"Blockchain Transaction" may be understood as a signed record, published to the blockchain, detailing the transfer of cryptocurrency/tokens and/or information. Blockchain transactions are usually cryptographically signed. An existing transaction may be referenced by a Transaction ID assigned to it or may be discoverable via the addresses of the sending or receiving Blockchain Accounts. Blochchain Transactions may be more generally understood as any form of record documenting a transaction in a blockchain system, including transactions associated with particular blockchain accounts.

"Derivative" may be understood as any value derived from another (such that f(y)=x, where x is the derivative), including the value itself (such that f(x)=x, where x is the derivative), where the derivation may be calculated by algorithms not limited to hashing functions such as PBKDF2 or Argon2. Derivatives may be more generally understood as any value derived, calculated, concatenated, and/or determined based at least in part on another value and/or set of values, criteria, algorithms, assumptions, or predicates.

"Encryption" and/or "Decryption" may be understood as any means for encrypting and/or decrypting information, respectively. Encryption and/or Decryption techniques may include the use of any symmetric encryption algorithms, including but not limited to Advanced Encryption Standard (AES), as well as any asymmetric algorithms, including but not limited to Elliptic Curve Cryptography (ECC).

"Hardware Wallet" may be understood as a device that stores a key-pair with the private key hidden from external observers, such as a U2F key device. A Hardware Wallet, may support the generation of signed blockchain transactions data without exposing the private key of the account. A Hardware Wallet may more generally be understood as any device that enables access to otherwise secured content.

"Key Derivation" may be understood as a derivation where the resulting Derivative is a private key, often the private key in a key-pair. A Key Derivation may more generally be understood as a process by which a Derivative that is a private key is obtained.

"Recovery Seed" may be understood as a derivative of a part and/or whole of the private key and/or other user-supplied information. A decrypted Recovery Seed may be used to recreate a user's original private key and/or recover/reset the associated account. A Recovery Seed may more generally be understood as a value that enables the recovery, at least in part, of a private key and/or other information necessary for recovering and/or resetting an account.

"Salt" may be understood as a randomly and/or pseudo-randomly generated, high-entropy, often large, value used in a Key Derivation. Use of Salts may increase the entropy (and thus security) of the resulting private key messaging server(s), a computing device of the user, a third-party system (such as a blockchain-based digital asset management system), etc. A Salt may more generally be understood as a random or pseudo-random value or data, that in some embodiments may be used to "hash" data, such as via the use of a one-way function.

"Transfer of Assets" may be understood as creating one or more transactions to send assets from one blockchain account to another, which may ultimately associates the assets with a new private key. If an asset includes information encrypted with the sender's key-pair, it may first be decrypted and re-encrypted with the key-pair of the recipient account. For assets stored in central locations (not in transactions), they may be simply re-associated with the recipient account. A Transfer of Assets may be more generally understood as the process of transferring assert to, from, and/or amongst one or more Blockchain Accounts.

"Two-Factor Authentication (2FA)" may be understood as any authentication method(s) that may allow a centralized service to more confidently confirm the identity of a user by any number of verification methods, including but not limited to email-verification, text/phone call-verification, HMAC-based One-time Passwords, Time-based One-time Passwords, or U2F keys. Two-Factor Authentication may be more generally understood as any authentication method that allows for a secondary layer of verification in order to allow user access.

"Universal Second Factor (U2F)" may be understood as any authentication method(s) that enable account owners to securely access their account using a physical key device. In some embodiments, a U2F device may contain a key-pair with a hidden private key and exposed public key and may also contain a microprocessor supporting decryption or generation of digital signatures while hiding these processes from external observers.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale. One skilled in the art will appreciate that various embodiments and/or aspects thereof may be combined and/or substituted.

DETAILED DESCRIPTION

The technology described herein relates to systems, apparatuses, and methods for implementing private key recovery in distributed ledger systems.

I. Overview

Figure 1A:
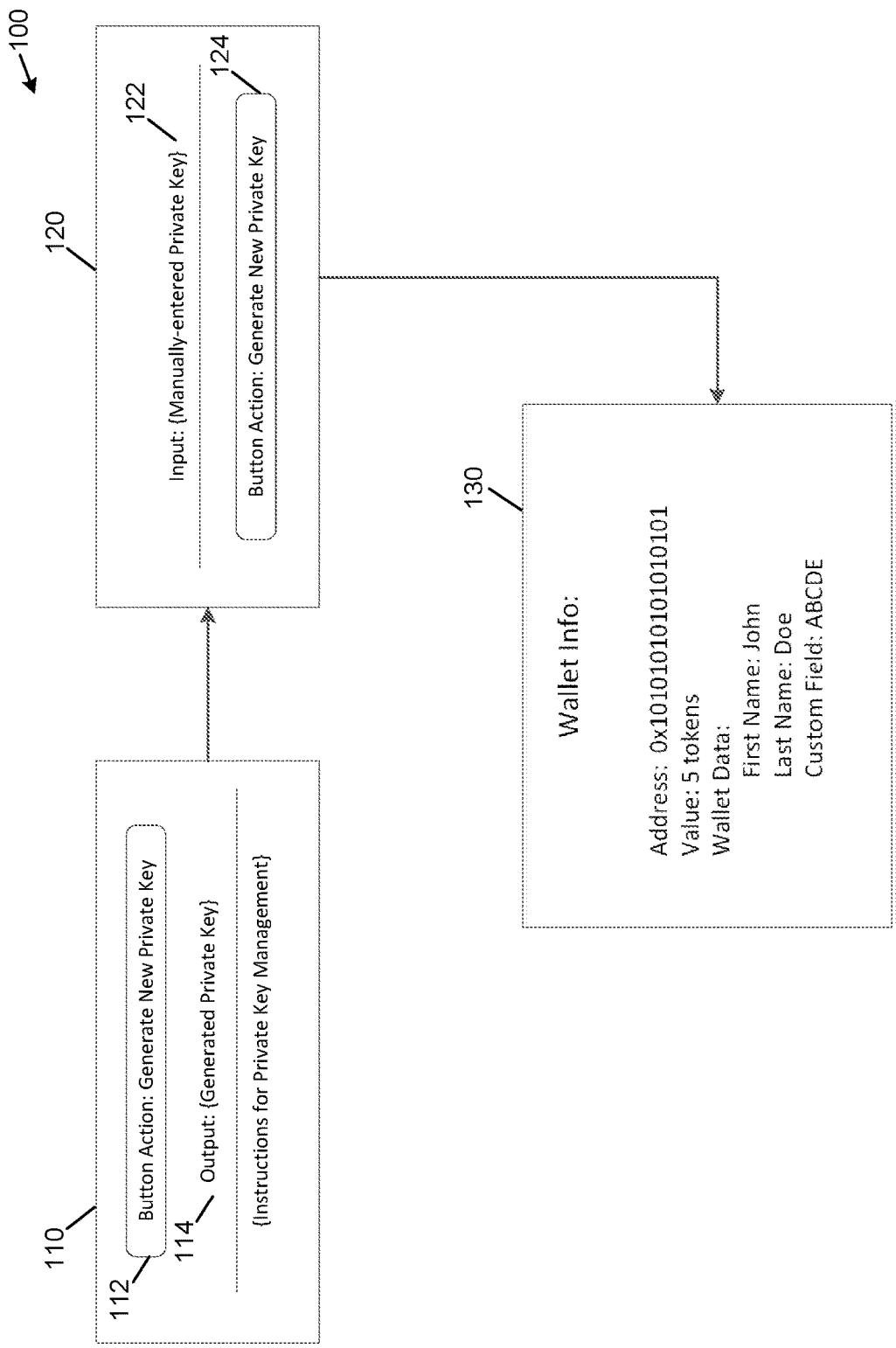
FIG. 1A is a diagram of a user interface in a conventional workflow for application authentication using a private key.

FIG. 1A is a diagram of a user interface 100 in a conventional workflow for application authentication. At 110, a conventional wallet is created. A user activates an interactive control of a graphical user interface (GUI) by, for example, clicking on a button 112. In response, a private key 114 is generated and rendered to the user. The private key 114 may be generated using a conventional key generation algorithm and is presented to the user via the GUI as a text string containing random characters, which are difficult for the user to remember and/or re-enter correctly by typing them in the correct sequence. The conventionally generated private key 114 must be retained by the user in order to access a conventional blockchain-based wallet, as shown at 120. To access the data associated with the conventional blockchain-based wallet, the user is required to type in the private key 114 (at 122) and activate an interactive user control, such as button 124, to unlock the conventional blockchain-based wallet. Only if the private key 114 has been entered correctly will the user gain access to wallet information 130. Wallet information 130 includes, for example, the address of the blockchain wallet/blockchain transaction, its value, and/or wallet-related data, such as identifying information (e.g., the first name of the user, the last name of the user, etc.)

Figure 1B:
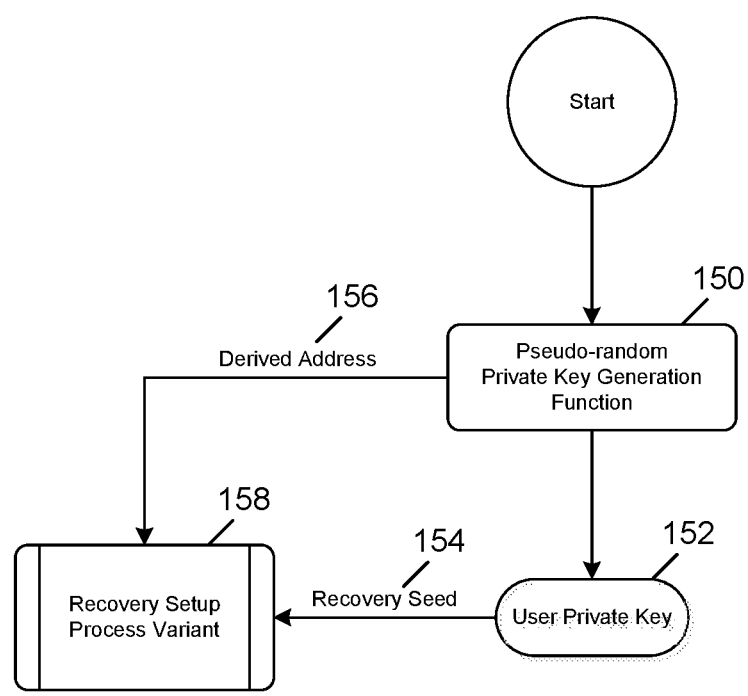
FIG. 1B is a high-level overview of a process for account setup and recovery using technologies for private key recovery in blockchain-based systems.

FIG. 1B is a high-level overview of a process for account setup and recovery using technologies for private key recovery in blockchain-based systems. Users may store assets in a blockchain-based environment and a need may arise to recover these assets in the event access is compromised. The systems and methods for private key recovery described herein accomplish this task.

According to an example embodiment of FIG. 1B, a system for private key recovery comprises a processor and computer-readable media having instructions thereon that, when executed by the processor, cause the system to execute pseudo-random private key generation code 150 to generate the user private key 152. The pseudo-random private key generation code 150 generates an address 156, which in some embodiments may be derived from the user private key 152. The address 156 points to a location of assets, such as a blockchain transaction. In some embodiments, the terms assets and user account are used interchangeably.

The instructions executed by the processor further cause the system to generate a recovery seed 154 using the user private key 152. According to various embodiments, the recovery seed 154 may consist of or comprise the user private key 152. In some embodiments, the recovery seed 154 is the user private key 152. Alternatively, the user private key 152 and/or supplemental recovery information may be hashed or otherwise scrambled to produce a derivative, such as the recovery seed 154. Examples of supplemental recovery information include a user identifier, a user password, an email address, answers to account recovery queries, etc. The recovery seed (also known as a derivative) may be created using a function such as PBKDF2 or Argon2 or another suitable one-way (non-invertible) function. Thus, the recovery seed 154 cannot be reverse engineered to determine the private key 152. In some embodiments, the recovery seed 154 is a fixed-length value. According to various embodiments, supplemental recovery information is supplied by the user through various GUI, as described further herein.

At 158, the recovery seed 154 and derived address 156 are used to set up the user's account for recovery as described further herein. According to various embodiments, the user's account may be set up for recovery using a passphrase, known information, notification-based recovery, U2F authentication, any combination thereof, etc.

Figure 1C:
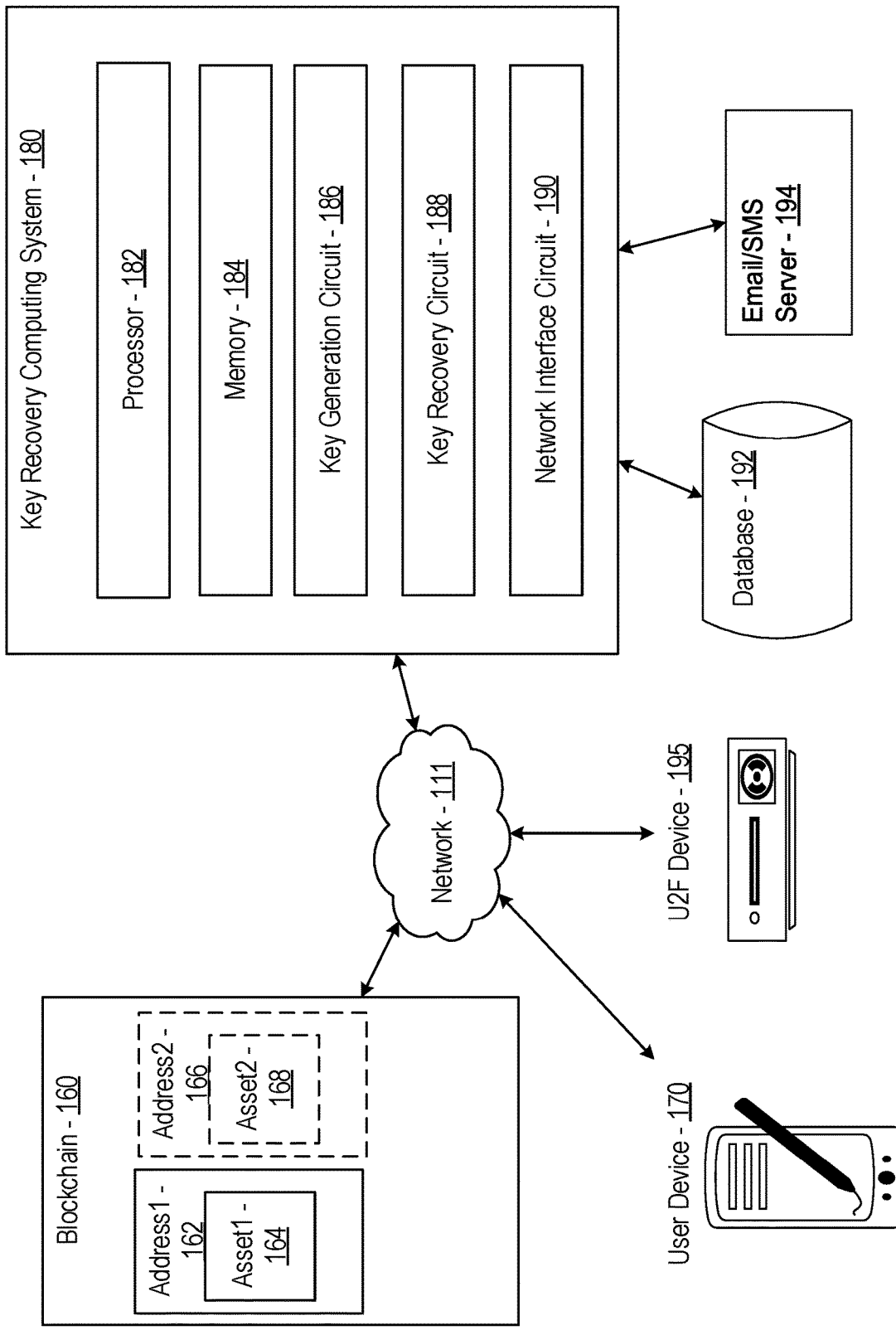
FIG. 1C is a computing system for private key recovery in blockchain-based systems, according to an example embodiment.

FIG. 1C is a computing system for private key recovery in blockchain-based systems, according to an example embodiment. As shown, the environment comprises a network 111, a blockchain 160, a user device 170, a key recovery computing system 180, a database 192, an email/SMS server 194, and a U2F device 195.

The blockchain 160 is an example distributed ledger used by the user of the user device 170 to store digital assets. The blockchain 160 is comprised of blocks, each identified by an address, such as the first address 162 and the second address 166. Each of the addresses is a storage location associated with an asset, such as the first asset 164 and the second asset 168. Assets are secured using a private key, which is generated by the key generation circuit 186 of the key recovery computing system 180.

A user device 170 is operated by the user. According to various embodiments, the user device 170 may be a smartphone, a laptop, a desktop, a tablet, an electronic wallet, a hardware-based wallet, etc. In some embodiments, a client application is installed on the user device 170 that comprises executable code allowing the user to interact with the key recovery computing system 180.

According to various embodiments, the key recovery computing system 180 may include at least one electronic circuit and at least one data storage entity. One or more electronic circuit(s) of the key recovery computing system 180 may be implemented as software code suitable for compilation, object code, executable file(s) and/or code, a set of machine language instructions, and/or in another suitable form for carrying out the computer-implemented method(s) described herein. In some embodiments, the one or more electronic circuit(s) may be implemented in a distributed fashion such that at least some of the code is executed and/or compiled on the user device 170. One or more data storage entities of the provider computing system 102 may be implemented as an electronic structure(s) suitable for storing information, including, for example, one or more persistent electronic structures, such as one or more database(s), electronic file(s), data mart(s), and the like. The data stored in the one or more data storage entities of the key recovery computing system 180 may be stored in a multi-dimensional form such that the structure of the data storage entity has two dimensions (e.g., a look-up table having indexed data) or more (e.g., a relational database, a multi-dimensional database, an online analytical processing (OLAP) cube, etc.).

In the embodiment of FIG. 1C, the key recovery computing system 180 comprises a processor 182, a memory 184, a key generation circuit 186, a key recovery circuit 188, and a network interface circuit 190. The key generation circuit 186 is structured to perform the processes associated with account/private key setup according to various embodiments described further herein. For example, in various embodiments, the key generation circuit 186 is configured to receive user-provided information, such as user identifier, asset address, supplemental information, etc., generate a private key, generate derivatives of various data elements, and store these in the database 192. The key recovery circuit 188 is structured to perform the processes associated with account/private key recovery according to various embodiments described further herein. For example, in various embodiments, the key recovery circuit 188 is configured to receive the user identifier, supplemental information, etc. needed to recover an account, fetch the corresponding recovery seed and/or other derivatives from the database 192, determine the corresponding address of blockchain assets, decrypt the recovery seed, use the recovery seed to access the assets, generate a new recovery seed, move the assets and/or protect the assets using the new recovery seed, etc.

The database 192 is a data storage entity, which may be implemented as a relational database, a blockchain-based storage infrastructure, etc. In some embodiments, the database 192 is part of the key recovery computing system 180. In some embodiments, the database 192 is operated by a separate provider such that the owner of the key recovery computing system 180 does not store sensitive user information on its own long-term storage media. The key generation circuit 186 is configured to store various information in the database 192, such as the recovery seed, user identifier, supplemental recovery information, asset addresses, etc.

The email/SMS server 194 allows for notification-based key recovery. In some embodiments, the email/SMS server 194 is part of the key recovery computing system 180.

The aforementioned systems communicate with one another via the network 111. The network 111 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments or combinations, the network 111 includes a local area network or a wide area network. In some embodiments, the network 111 includes the internet. The network 111 is facilitated by short- and/or long-range communication technologies, such as Bluetooth® transceivers, Bluetooth® beacons, RFID transceivers, NFC transceivers, Wi-Fi transceivers, cellular transceivers, wired network connections (e.g., Ethernet), etc.

The U2F device 195 is operated by the user. An example U2F device 195 (e.g., a token, a security key), comprises a memory and connects with auxiliary systems, such as the user device 170, via USB, near-field communications, Bluetooth, or another suitable protocol.

II. Technologies for Private Key Recovery Using a Passphrase Derivative

Figure 2A:
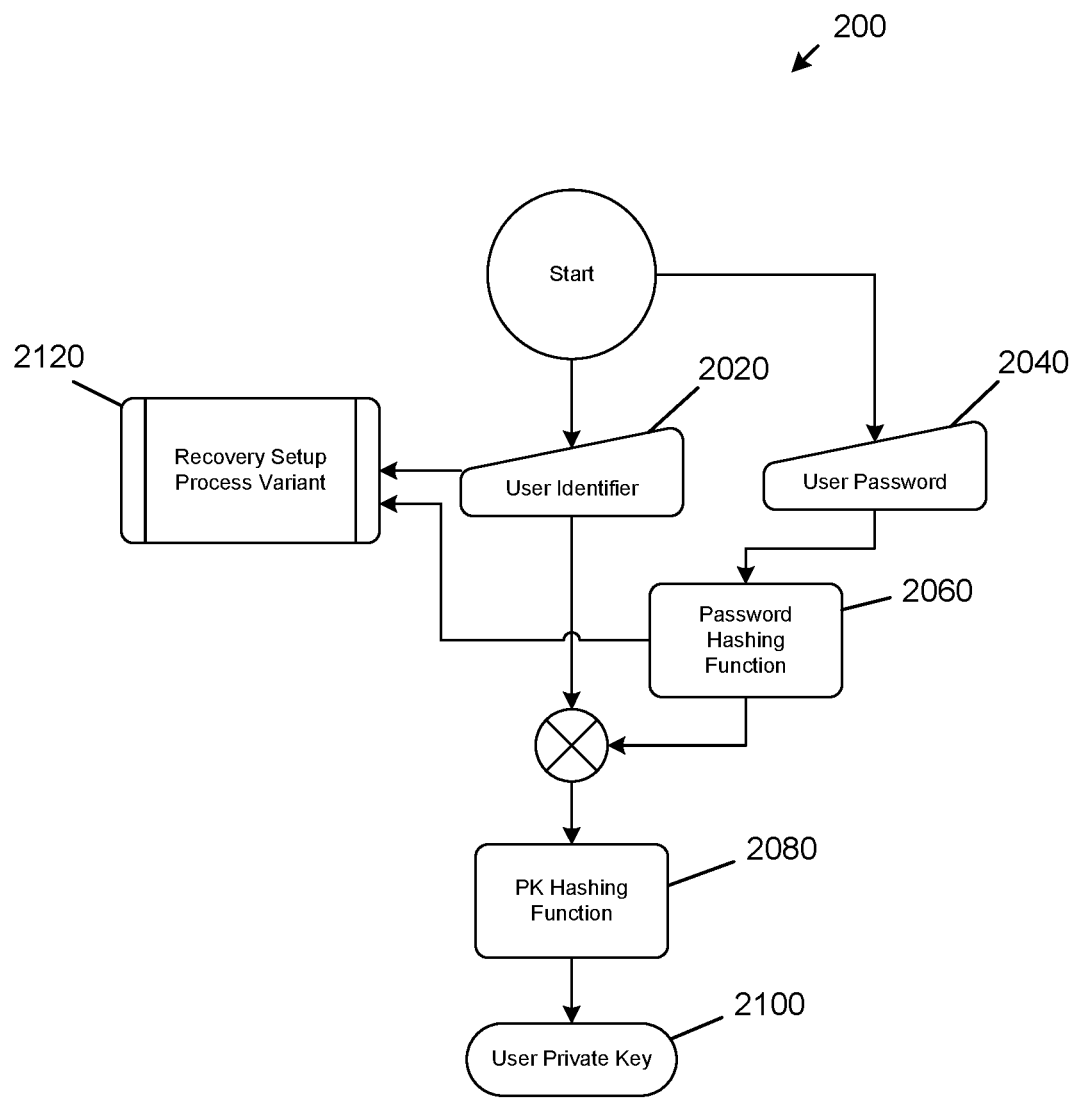
FIG. 2A is a diagram of a process for account setup using a user-specified password that enables private key recovery in blockchain-based systems, according to an example embodiment.

FIG. 2A is a diagram of a process 200 for account setup using a user-specified password that enables private key recovery in blockchain-based systems, according to an example embodiment. As shown, the account creation/setup process allows a user to create an account using the user's desired user ID and password. The goal of the process 200 is to abstract/hide the user's blockchain private key and account address while setting up a method for recovering the user's account should the private key and/or password be forgotten.

At 2020, the user provides a user ID. At 2040, the user provides a password. According to various embodiments, the user ID and password may be provided by the user as plaintext values selected and/or created by the user.

In some embodiments, the user is provided with a user interface having interactive user controls for providing the user ID and/or password. The user interface may be provided to the user through a computing device of the user, such as the user device 170 of FIG. 1C. According to various embodiments, the computing device of the user may be a desktop computing system and/or a mobile device, such as a smartphone, a tablet, a smartwatch, a smart bracelet capable of projecting user interface functionality onto a surface, etc. In the example embodiment, the user interface is a GUI visually presented to the user through the computing device of the user. In the example embodiment, the user interface includes an electronic form rendered to the user through the display component of the user computing device. However, one skilled in the art will appreciate that user interfaces of various embodiments may comprise various aural, auditory, tactile, kinesthetic and/or haptic system(s) and/or component(s) for notifying and interacting with the user. The computing device of the user may be configured to receive and render to the user notifications (such as email messages, SMS/text messages, etc.), buzz, vibrate, trigger an LED light indicator, and/or otherwise alert the user to the alert(s) and/or notification(s) received by the user through the computing device. The user interface of the example embodiment comprises various controls for providing information and receiving input from the user. These controls include interactive user controls, such as text fields, record sets for presenting data in a consolidated and/or tabular form where applicable, buttons, option boxes, and/or containers, scroll bars, pop-up forms and the like for grouping interactive user controls together to facilitate user input of information.

In some embodiments, the key recovery computing system may access auxiliary computing systems through a single sign-on process transparent to the user to receive the login credentials of the user instead of or in addition to accepting the user ID and password entered by the user. For example, in some embodiments, the application may use an application programming interface (API) provided by an auxiliary system to access the user's login credentials and use these credentials to secure the user's private key for the application. In some embodiments, the application may be structured to accept input from various hardware components, such as a camera, a sensor, a fingerprint reader, a retinal scanner, etc. for reading the user's biometric information and digitizing the biometric information for use instead of or in addition to the password to secure the user's private key.

At 2060, the user's password is hashed using a non-invertible function, such as PBKDF2, Argon2, etc. The output is a non-invertible hash of the password of the user (the password hash).

At 2080, the private key of the user is generated to create a private key (output key) 2100. In the example embodiment, the private key of the user is generated from a hash of the user ID in conjunction with a hash of the password. In some embodiments, the private key of the user is generated using a hash of one or more user-supplied answers to security questions provided by the user as described in reference to FIG. 2B. In some embodiments, the password hash is stored in a transaction data element of a blockchain transaction.

In some embodiments, the length of the password hash is set to be sufficiently long to prevent any compression of the original password but remain within the size restrictions of a data field on the blockchain-based platform on which the key recovery computing system and/or the application is implemented. In an example embodiment using Ethereum™, the length or maximum length of the password hash is 16 bytes.

In some embodiments, the private key hashing function of 2080 uses an algorithm that allows the output key length to be less than or equal to the size of a private key generated using the API native to the blockchain platform of the key recovery computing system. In the example embodiment using Ethereum™, the length of the private key 2100 is 32 bytes. The private key 2100 may be formatted to comply with the formatting convention for natively generated keys and/or addresses (e.g., "0x" appended for Ethereum™). In some embodiments, at least a portion of the private key specifies the blockchain address to which the key corresponds.

In some embodiments, a cryptographic salt is used as one of the inputs to creating the private key 2100 to further secure the private key 2100 of the user. The cryptographic salt is a computer-generated value (numeric, alphanumeric, etc.) that is unique to the user. In some embodiments, the cryptographic salt is a randomly generated value. In some embodiments, the cryptographic salt is stored on a memory device associated with the key recovery computing system for later use in the private key recovery process. In some embodiments, the cryptographic salt is provided to the user through the interactive user interface and may be supplied by the user as part of the private key recovery process.

At 2120, account recovery setup is performed according to various embodiments described further herein. In some embodiments, the inputs to account recovery process 2120 include the password and/or the password hash and the user ID of the user.

Figure 2B:
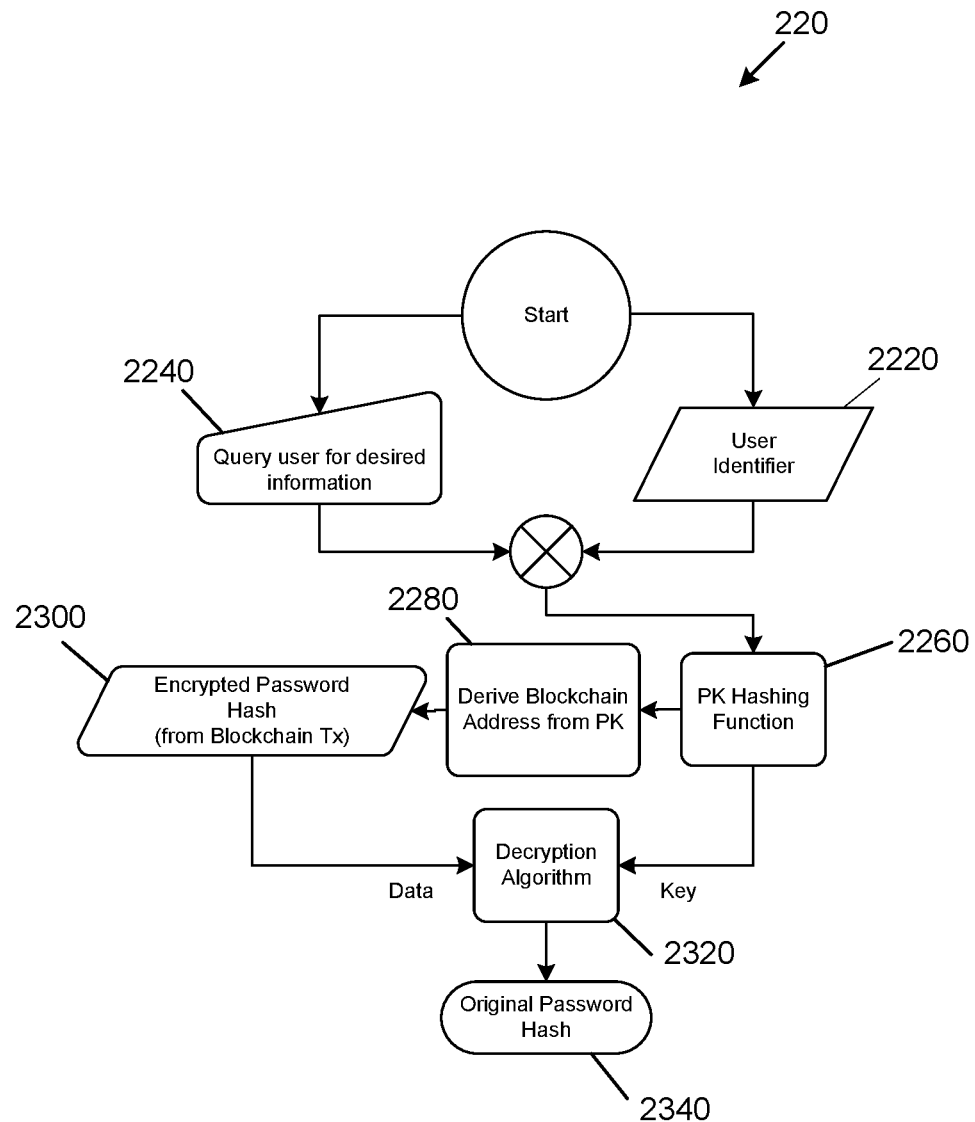
FIG. 2B is a diagram of a process for private key recovery, according to an example embodiment.

FIG. 2B is a diagram of a process 220 for private key recovery, according to an example embodiment. The process 220 requires that the user be able to reproduce the same information offered in the recovery setup process 200 of FIG. 2A. Given correct information, the recovery private key can be recreated.

At 2220, a user ID is received. For example, the user may be provided with an interactive user interface through the computing device of the user to collect this information.

At 2240, the user is queried for recovery information. In the example embodiment, the recovery information may include a non-invertible hash of the password, biometric information received by the key recovery computing system through an input device such as a camera and/or a sensor (not shown), at least one answer to at least one secret question provided by the user during account setup, an image such as an image of a QR code, a list of passphrases, a sizable list of choices representing various preference information of the user, and/or a combination thereof. In some embodiments, the combination is an ordered combination. In some embodiments, an image is generated, printed and scanned in by a device.

At 2260, a hashing function is applied to the user ID and the recovery information to generate a recovery private key.

At 2280, the blockchain address is derived from or with the recovery private key generated at 2260. In some embodiments, a portion of the recovery private key comprises the blockchain address and the recovery private key is parsed to extract the blockchain address. In some embodiments, the application is configured to call a function native to the blockchain platform used by the key recovery computing system to obtain the blockchain address.

At 2300, the recovery information is retrieved from the data element of the blockchain transaction associated with the blockchain address derived at 2280. In some embodiments, the recovery information is stored in a database other than the blockchain that underlies the key recovery computing system.

At 2320, if the recovery information retrieved at 2300 is encrypted, it is decrypted using the inverse of the algorithm used for encryption performed using the password hash generated at 2060 of FIG. 2A.

At 2340, the hash of original recovery information is derived.

Figure 2C:
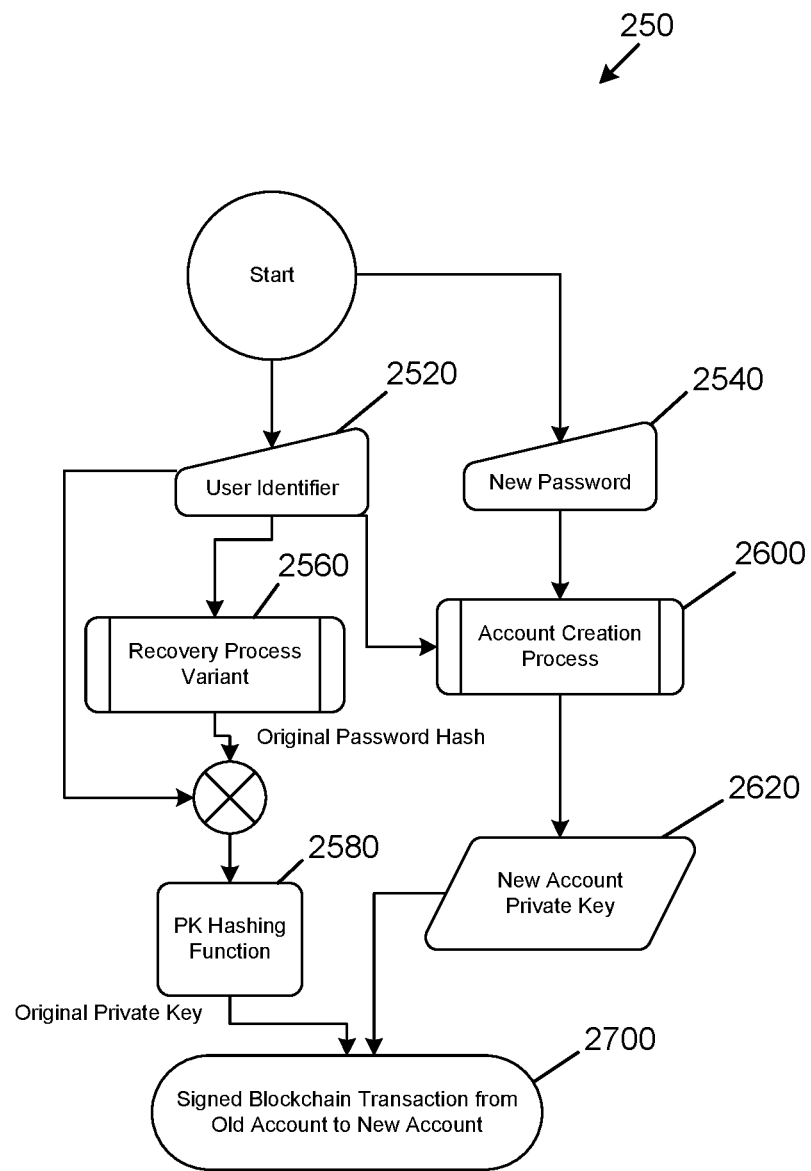
FIG. 2C is a diagram of a process for private key and account data recovery, according to an example embodiment.

FIG. 2C is a diagram of a process 250 for private key and account data recovery, according to an example embodiment. The goal of the process 250 is to recover the recovery information in order to reconstruct the user's original private key, such as the private key 2100 of FIG. 2A.

At 2520 and 2540, the user ID and recovery information are obtained as described, for example, in reference to 2220 and 2240 of FIG. 2B.

At 2560, a key recovery process is performed. In some embodiments, the recovery process comprises the steps performed at 2260-2340 of FIG. 2B. In some embodiments, the recovery process comprises using user-specified known information, such as that described in reference to FIG. 3B. In some embodiments, the recovery process comprises sending a secure notification to the user via email, SMS/text message etc., as described in reference to FIG. 4B. In some embodiments, the recovery process comprises retrieving custodial data related to the account of the user as described, for example, in reference to FIG. 5B.

At 2580, a private key hashing function is applied to the output of the process 2560 in conjunction with the user identifier of 2520 to recover the original private key used to sign the original blockchain transaction.

At 2600-2620, the user's desired new recovery information (e.g., a new password) is obtained through, for example, the interactive user interface rendered through the computing device of the user. The new recovery information is used to create a new private key. In some embodiments, a new account on the application is also created for the user as discussed, for example, in reference to 200 of FIG. 2A. In some embodiments, the new private key is used to secure other accounts within or outside the key recovery computing system such that the login information for any linked accounts is updated when the account is recovered.

At 2700, the key recovery computing system is structured to move the user's data transactions and/or assets (e.g., tokens) from the original account to the new account. In some embodiments, any encrypted data is decrypted with the user's password hash obtained at 2560 and encrypted with the user's new private key obtained at 2060 of FIG. 2A, which advantageously enables the new data to be sent securely to the new address associated with the new account. In some embodiments, the user is alerted through a notification such as an email, SMS/text message, etc. that the user's account has been recovered. Advantageously, the user is thus able to further simplify private key management. For example, if the user receives a recovery notification and the user did not initiate account recovery, the user may be alerted to potential fraudulent activity and may take appropriate action before losing access to blockchain-based assets. Thus, in some embodiments, the user is alerted as soon as the recovery request is received and before the transactions are moved to the new address. In some embodiments, the key recovery computing system is configured to wait for the user's confirmation that the account should be recovered before proceeding. In some embodiments, instead of or in addition to notifying the user, a log file is generated and/or updated to include the details of the recovery request.

Figure 2D:
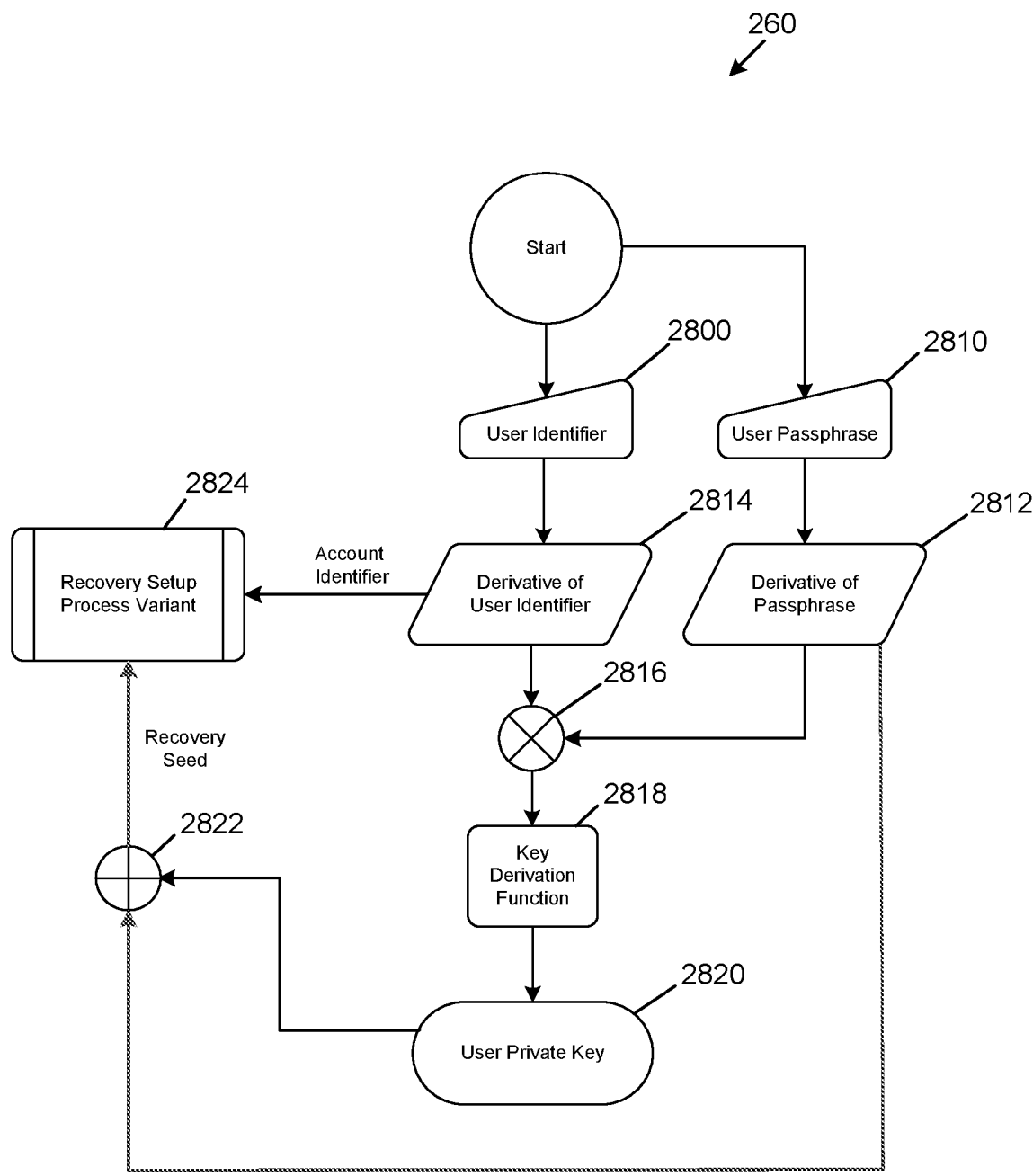
FIG. 2D is a diagram of a process for account setup using a passphrase derivative, according to an example embodiment.

FIG. 2D is a diagram of a process for account setup using a passphrase derivative, according to an example embodiment. Referring to FIG. 2D generally, a derivative of a user-defined identifier (also known as supplemental recovery information, such as an email address) is used in conjunction with a derivative of the user's selected passphrase to derive the resulting key pair. The private key, or alternatively a derivative of any combination of the user's identifier and passphrase, is then used as the recovery seed in a variant of the recovery setup process shown in FIG. 2E, along with an account identifier. In some embodiments, the account identifier is a derivative of the user identifier or derivative of the account's key-pair. Advantageously, the alternative recovery seed option may be chosen in order to reduce the size of the seed for cheaper storage on blockchain-based systems or other suitable systems.

At 2800, the user provides a user ID. At 2810, the user provides a password. According to various embodiments, the user ID and password may be provided by the user as plaintext values selected and/or created by the user.

In some embodiments, the user is provided with a user interface having interactive user controls for providing the user ID and/or password. The user interface may be provided to the user through a computing device of the user. According to various embodiments, the computing device of the user may be a desktop computing system and/or a mobile device, such as a smartphone, a tablet, a smartwatch, a smart bracelet capable of projecting user interface functionality onto a surface, etc. In the example embodiment, the user interface is a GUI visually presented to the user through the computing device of the user. In the example embodiment, the user interface includes an electronic form rendered to the user through the display component of the user computing device. However, one skilled in the art will appreciate that user interfaces of various embodiments may comprise various aural, auditory, tactile, kinesthetic and/or haptic system(s) and/or component(s) for notifying and interacting with the user. The computing device of the user may be configured to receive and render to the user notifications (such as email messages, SMS/text messages, etc.), buzz, vibrate, trigger an LED light indicator, and/or otherwise alert the user to the alert(s) and/or notification(s) received by the user through the computing device. The user interface of the example embodiment comprises various controls for providing information and receiving input from the user. These controls include interactive user controls, such as text fields, record sets for presenting data in a consolidated and/or tabular form where applicable, buttons, option boxes, and/or containers, scroll bars, pop-up forms and the like for grouping interactive user controls together to facilitate user input of information.

In some embodiments, the key recovery computing system may access auxiliary computing systems through a single sign-on process transparent to the user to receive the login credentials of the user instead of or in addition to accepting the user ID and password entered by the user. For example, in some embodiments, the application may use an application programming interface (API) provided by an auxiliary system to access the user's login credentials and use these credentials to secure the user's private key for the application. In some embodiments, the application may be structured to accept input from various hardware components, such as a camera, a sensor, a fingerprint reader, a retinal scanner, etc. for reading the user's biometric information and digitizing the biometric information for use instead of or in addition to the password to secure the user's private key.

At 2812, the user's password is scrambled to produce a derivative. For example, the user's password may be hashed using a non-invertible function, such as PBKDF2, Argon2, etc. The output is a first non-invertible identifier derived from the password of the user.

At 2814, the user's identifier is scrambled to produce a derivative. For example, the user's identifier may be hashed using a non-invertible function, such as PBKDF2, Argon2, etc. The output is a second non-invertible identifier derived from the user identifier.

At 2816, the first non-invertible identifier derived from the password of the user and the second non-invertible identifier derived from the user identifier are combined. According to various embodiments, these values may be converted to plain text and concatenated, etc.

At 2818, the private key of the user is generated to create a private key (output key) 2820. In some embodiments, the private key of the user is generated using the value produced at 2816 (e.g., a concatenated string) as the input. In other embodiments, the private key of the user is generated from a first non-invertible identifier in conjunction with the second non-invertible identifier.

At 2822, the system is configured to select the private key of the user generated at 2820 or the first non-invertible identifier derived from the password of the user generated at 2812 as a recovery seed.

At 2824, account recovery setup is performed according to various embodiments described further herein. In some embodiments, the inputs to account recovery process 2824 include the second non-invertible identifier derived from the user identifier at 2814.

Figure 2E:
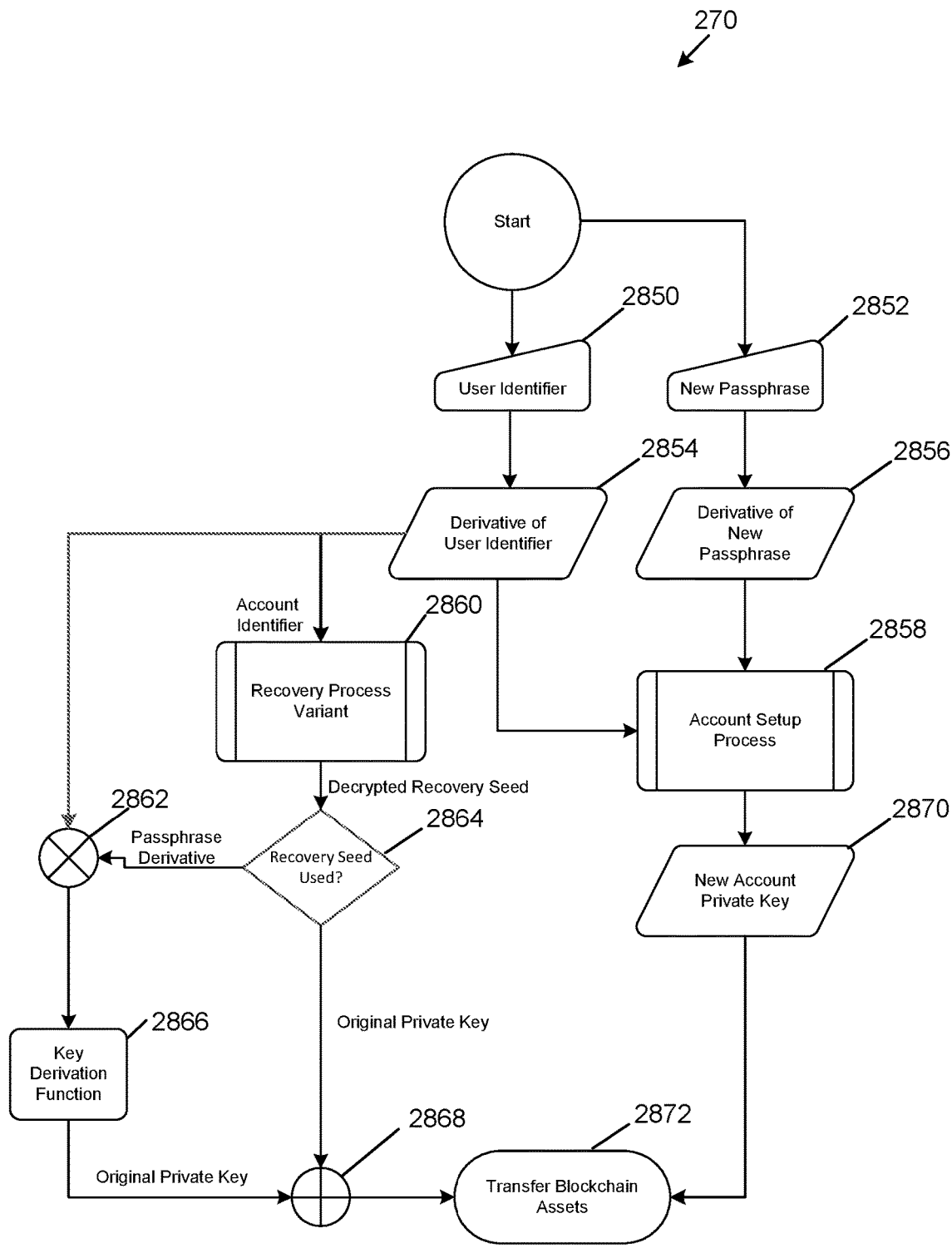
FIG. 2E is a diagram of a process for account recovery using a passphrase derivative, according to an example embodiment.

FIG. 2E is a diagram of a process for account recovery using a passphrase derivative, according to an example embodiment. Referring to FIG. 2E generally, the recovery seed in this configuration is the original private key itself or a derivative of the passphrase used to generate the original private key, such as the first non-invertible identifier derived from the password of the user at step 2812 of FIG. 2D. Where the first non-invertible identifier is used, there is enough information to regenerate the original private key. In both instances, the original private key is derived, in part, from a now-unknown passphrase, so the user must provide a new passphrase to generate a new private key as per the original account setup process. Blockchain assets are then transferred from the original account to the new account.

At 2850, a user ID is received. For example, the user may be provided with an interactive user interface through the computing device of the user to collect this information. At 2854, a derivative of the user identifier is generated. For example, the derivative may be generated using a hash function.

At 2852, a user password is received. At 2856, a derivative of the user password is generated. For example, the derivative may be generated using a hash function. Upon verification of the user's account as described, for example, further herein with respect to 2860-2872, at 2858 a new account is set up for the user according to the example process of FIG. 2D. At 2870, a new private key is generated for the user. At 2872, the key recovery computing system is structured to move the user's data transactions and/or assets (e.g., tokens) from the original account to the new account. In some embodiments, any encrypted data is decrypted as described at 2860-2872 and then encrypted with the user's new private key obtained at 2870, which advantageously enables the new data to be sent securely to the new address associated with the new account. In some embodiments, the user is alerted through a notification such as an email, SMS/text message, etc. that the user's account has been recovered. Advantageously, the user is thus able to further simplify private key management. For example, if the user receives a recovery notification and the user did not initiate account recovery, the user may be alerted to potential fraudulent activity and may take appropriate action before losing access to blockchain-based assets. Thus, in some embodiments, the user is alerted as soon as the recovery request is received and before the transactions are moved to the new address. In some embodiments, the key recovery computing system is configured to wait for the user's confirmation that the account should be recovered before proceeding to transfer the assets at 2872. In some embodiments, instead of or in addition to notifying the user, a log file is generated and/or updated to include the details of the recovery request.

Referring now to steps 2854-2872, these steps collectively describe recovery of the old account using the passphrase derivative. 2860 is a recovery process variant such as that described in reference to FIG. 2B, steps 2240-2340. In another example recovery process variant, the derivative of the user identifier generated at 2854 uniquely identifies or is associated with the old account. In some embodiments, a portion of the derivative of the user identifier generated at 2854 comprises or is associated with a blockchain address. The recovery information, such as the recovery seed, may be retrieved from a data element of the blockchain transaction associated with the blockchain address. In some embodiments, the recovery seed is stored and retrieved from a database other than the blockchain that underlies the key recovery computing system.

At 2862-2864, a determination is made whether the recovery seed used is a passphrase derivative, such as the first non-invertible identifier of FIG. 2D. If the answer is affirmative, then the recovery seed is combined (e.g., summed, concatenated, etc.) with the user identifier and, at 2866, a key derivation function is used to derive the original private key from the recovery seed. If the answer is negative, then the recovery seed is the original private key. At 2868, the private key (either derived or original) is sent as an input to the process 2872, which is configured to transfer blockchain assets to the user's new account as described above.

Figure 2F:
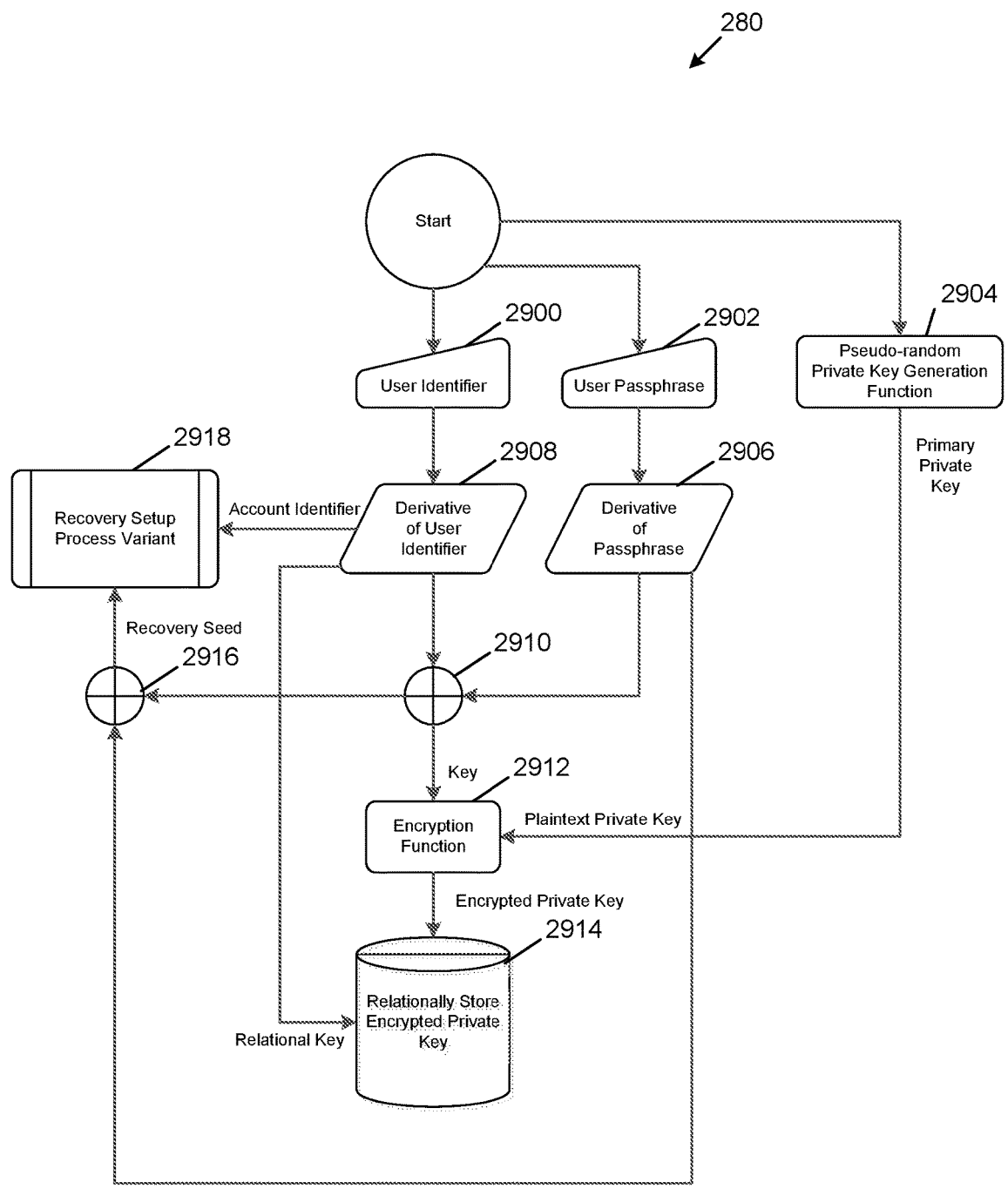
FIG. 2F is a diagram of a process for account setup using a passphrase derivative and a pseudo-random private key generation function, according to an example embodiment.

FIG. 2F is a diagram of a process for account setup using a passphrase derivative and a pseudo-random private key generation function, according to an example embodiment. Referring to FIG. 2F generally, this configuration is a combination of the embodiments of FIG. 1B and FIG. 2D. A primary private key will be generated as per FIG. 1B, which will then be encrypted by the private key resulting from the embodiment of FIG. 2D. The encrypted primary key may be stored on a storage media. The account setup process will then be executed as per FIG. 2D.

At 2900, the user provides a user ID and, at 2908, a derivative of the user id is generated. At 2902, the user provides a password and, at 2906, a derivative of the password is generated. At 2904, a pseudo-random private key generation function is executed to generate the primary private key for the user.

At 2910, the derivative or the user ID, the derivative of the passphrase, or both are sent to an encryption function to encrypt, at 2912, the plaintext private key generated at 2904. The encrypted primary key may be stored, at 2914, in a trusted central database, Blockchain transaction, or on a device owned by the user, not limited to a phone or U2F device. To facilitate retrieval of the encrypted key during the account recovery process, the encrypted key may be stored relationally with respect to the user identifier, derivative of the user identifier, or derivative of the user identifier and passphrase together. Should a third party store the encrypted key on behalf of the user, it may be access-controlled to require 2-factor authentication. Also at 2910, the derivative or the user ID, the derivative of the passphrase, or both are sent to the process 2916, which selects one of these items as the recovery seed. At 2918, the recovery seed is sent to a recovery setup process, such as an example setup process of FIG. 3E.

Figure 2G:
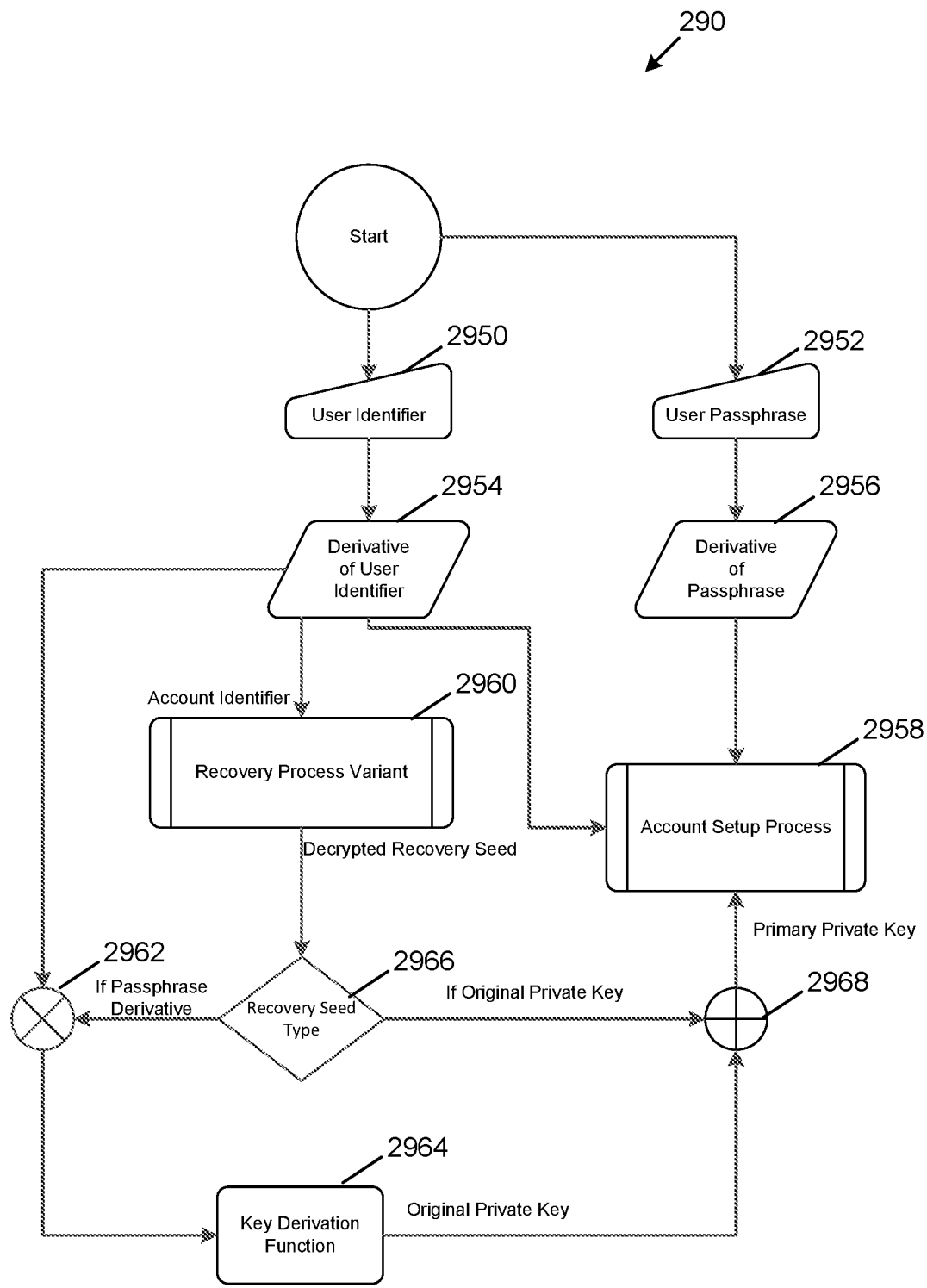
FIG. 2G is a diagram of a process for account recovery using a passphrase derivative and a pseudo-random private key generation function, according to an example embodiment.

FIG. 2G is a diagram of a process for account recovery using a passphrase derivative and a pseudo-random private key generation function, according to an example embodiment. In the embodiment of FIG. 2G, a new primary private key may be assigned to the account and assets may be transferred to this new account.

At 2950, a user ID is received. For example, the user may be provided with an interactive user interface through the computing device of the user to collect this information. At 2954, a derivative of the user identifier is generated. For example, the derivative may be generated using a hash function.

At 2952, a user password is received. At 2956, a derivative of the user password is generated. For example, the derivative may be generated using a hash function. Upon verification of the user's account as described, for example, further herein with respect to 2960-2966, at 2958 a new account is set up for the user according to the example process of FIG. 2F.

Referring now to steps 2960-2966, these steps collectively describe recovery of the old account using the passphrase derivative. 2960 is a recovery process variant such as that described in reference to FIG. 2B, steps 2240-2340. In another example recovery process variant, the derivative of the user identifier generated at 2954 uniquely identifies or is associated with the old account. In some embodiments, a portion of the derivative of the user identifier generated at 2954 comprises or is associated with a blockchain address. The recovery information, such as the recovery seed, may be retrieved from a data element of the blockchain transaction associated with the blockchain address. In some embodiments, the recovery seed is stored and retrieved from a database other than the blockchain that underlies the key recovery computing system.

At 2862-2864, a determination is made whether the recovery seed used is a passphrase derivative, such as the first non-invertible identifier of FIG. 2D. If the answer is affirmative, then at 2962, the recovery seed is combined (e.g., summed, concatenated, etc.) with the derivative of the user identifier and the resulting value is sent to a key derivation function configured to derive, at 2964, the original private key from the resulting value. If the answer is negative, then the recovery seed is the original private key.

At 2968, the private key (either derived or original) is sent as an input to the process 2958, which is configured to encrypt the private key with the new passphrase derivative of 2956.

III. Technologies for Private Key Recovery Using a Known Information Derivative

Figure 3A:
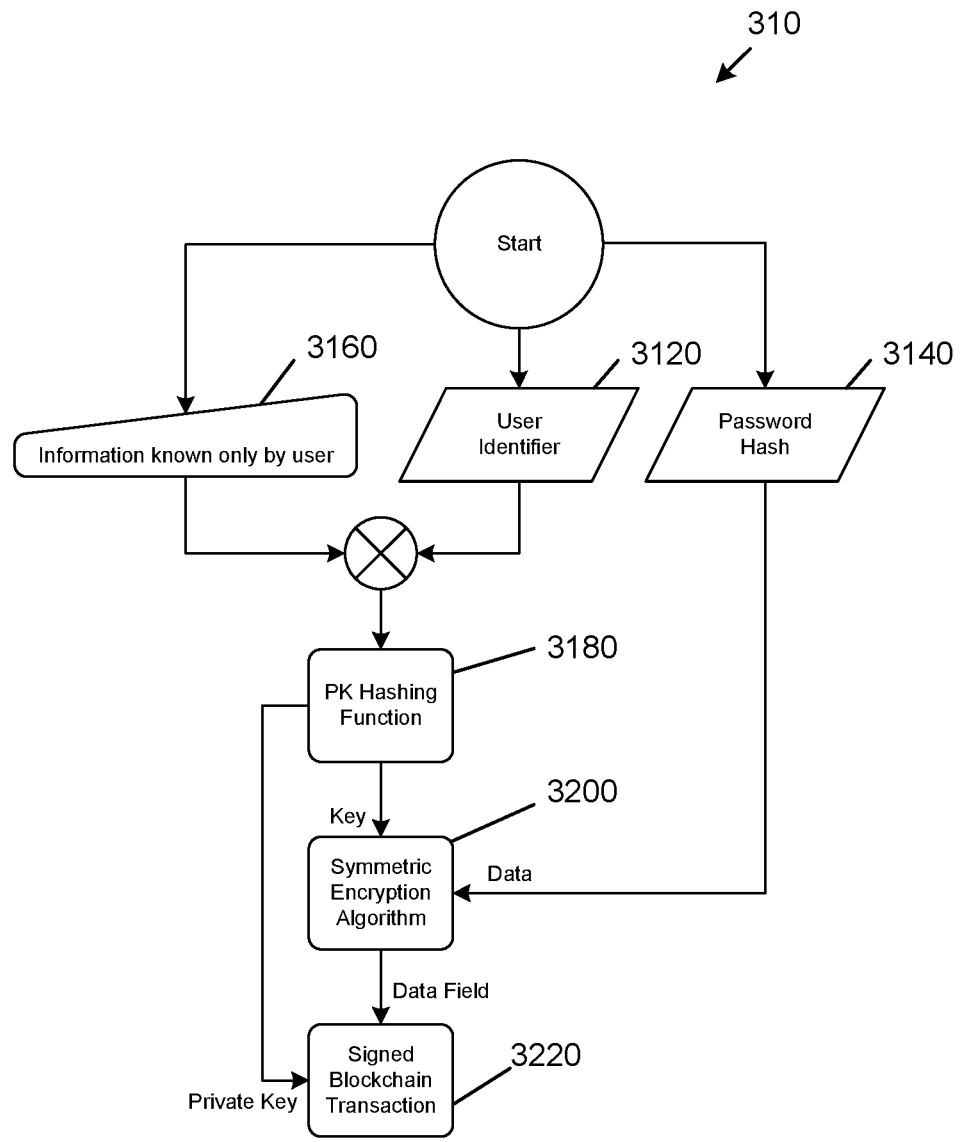
FIG. 3A is a diagram of an example process for account setup using user-specified known information, according to an example embodiment.

FIG. 3A is a diagram 310 of an example process for account setup using user-specified known information that enables private key recovery in blockchain systems, according to an example embodiment. The known information embodiment of the setup process involves querying the user for information that is feasibly reproducible by the user exclusively and using this information to create an alternative private key and/or an application account to securely store the user's recovered transactions.

At 3120 and 3140, the user ID and password hash, respectively, are obtained.

At 3160, recovery information known only by the user is obtained. In some embodiments, the recovery information is obtained using interactive controls of the user interface rendered to the user through the computing device of the user. According to various embodiments, recovery information includes at least some or all of the following: security/challenge question answers, personal identification information such as SSN, driver's license, or passport numbers, and/or preference information whereby a user is presented a sequence of arbitrary choices where the result of the user's cumulative choices is used to create the new private key.

At 3180, the provided recovery information is hashed along with the user ID obtained at 3120 to create a private key. In some embodiments, it is desirable to have a high degree of resolution, meaning that a substantial amount of recovery information is collected to prevent automated malicious reproduction of the private key or guessing of the required information.

At 3200, to secure the user's original password hash obtained at 3140, the password hash is encrypted with the private key obtained at 3180 using an asymmetric encryption scheme. In some embodiments, the asymmetric encryption scheme is native to the blockchain platform of the key recovery computing system (i.e. Elliptic Curve for Ethereum™). In some embodiments, a symmetric encryption algorithm, such as AES, is used.

At 3220, the encrypted output of 3200 is sent to the blockchain address corresponding to the private key obtained at 3180 and the blockchain transaction is signed using the password hash. In some embodiments, the encrypted output of 3200 may be stored in a trusted central database associated with the key recovery computing system.

Figure 3B:
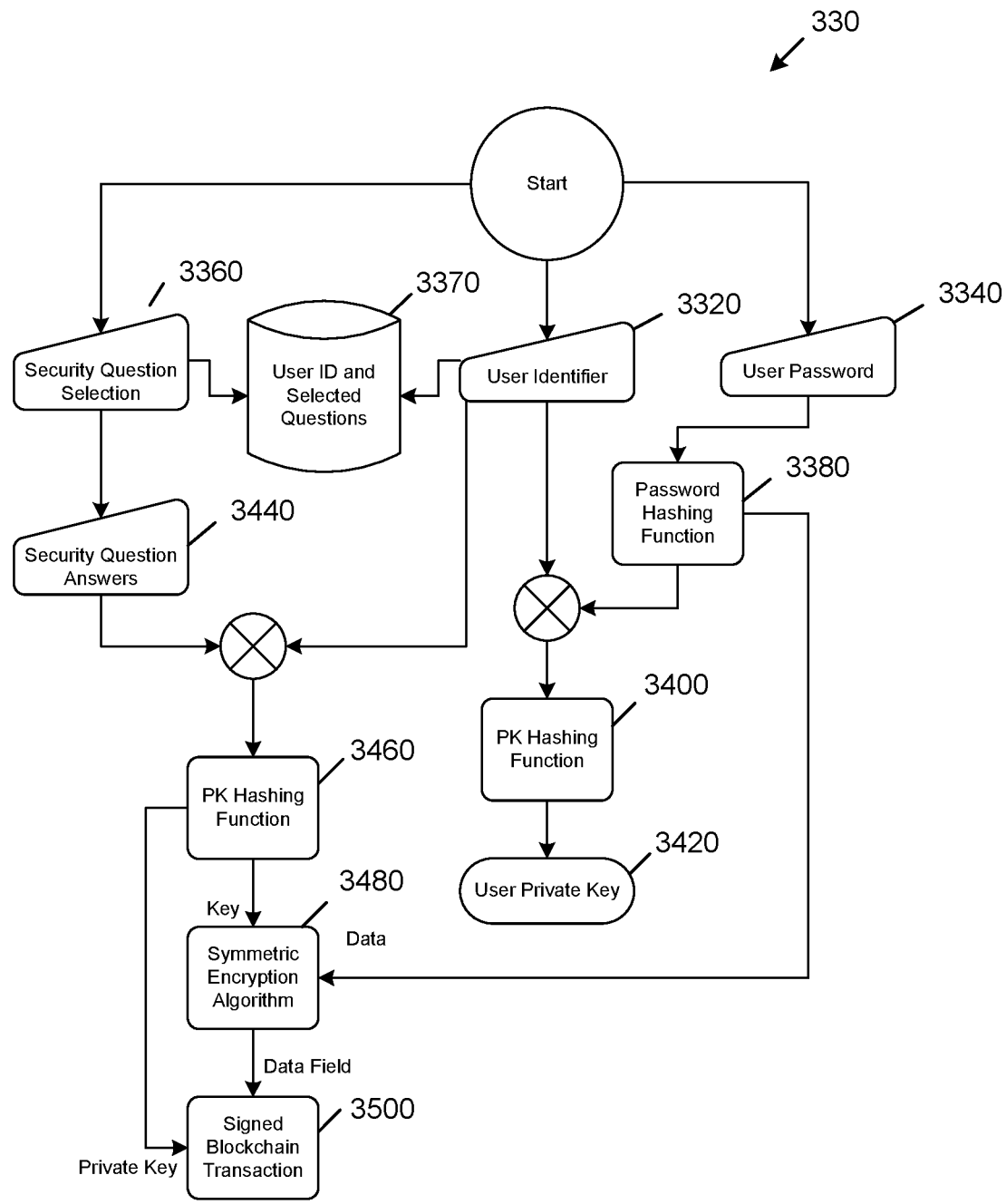
FIG. 3B is a diagram of another example process for account setup using user-specified known information, according to an example embodiment.

FIG. 3B is a diagram of another example process 330 for account setup using user-specified known information, according to an example embodiment. At 3320, 3340, 3380, 3400, and 3420, a user private key is generated based on the user identifier and user password similarly to the process described with respect to FIG. 2A. At 3360, security questions are generated and rendered to the user. In some embodiments, the security questions and/or answers are stored in a central database as shown at 3370. At 3440, user answers to the security questions are obtained. In some embodiments, the user uses an interactive user interface to enter this data in cleartext format. At 3460, a hashing function is applied to the user ID obtained at 3320 and the recovery information obtained at 3440 to generate a private key. At 3480, the private key is encrypted using the password hash generated at 3380. In some embodiments, the private key is encrypted using a symmetric encryption algorithm. The output of 3480 is stored in the data field of a blockchain transaction. At 3500, the blockchain transaction is signed using the private key generated at 3460.

Figure 3C:
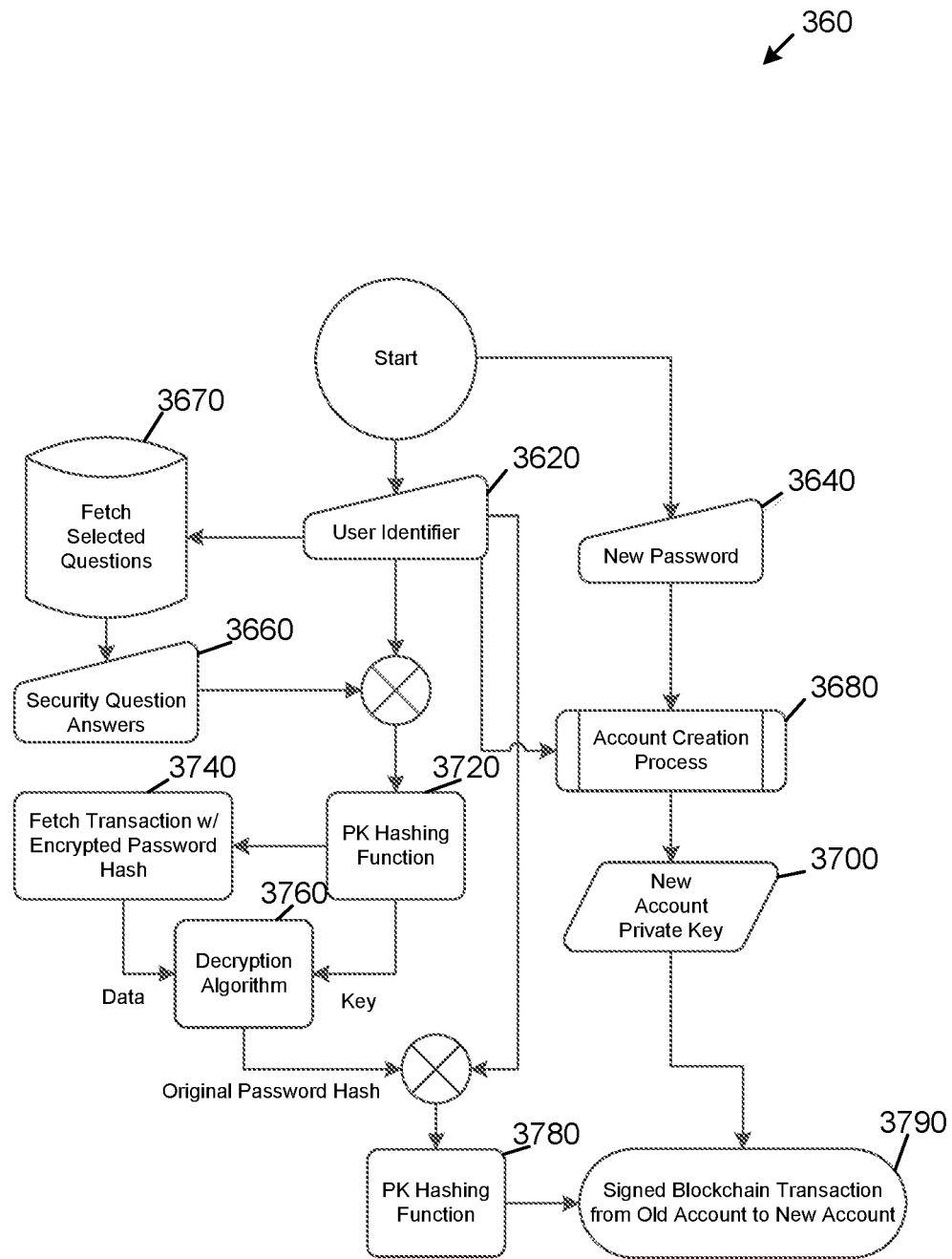
FIG. 3C is a diagram of a process for private key and data recovery using user-specified known information, according to an example embodiment.
Figure 3D:
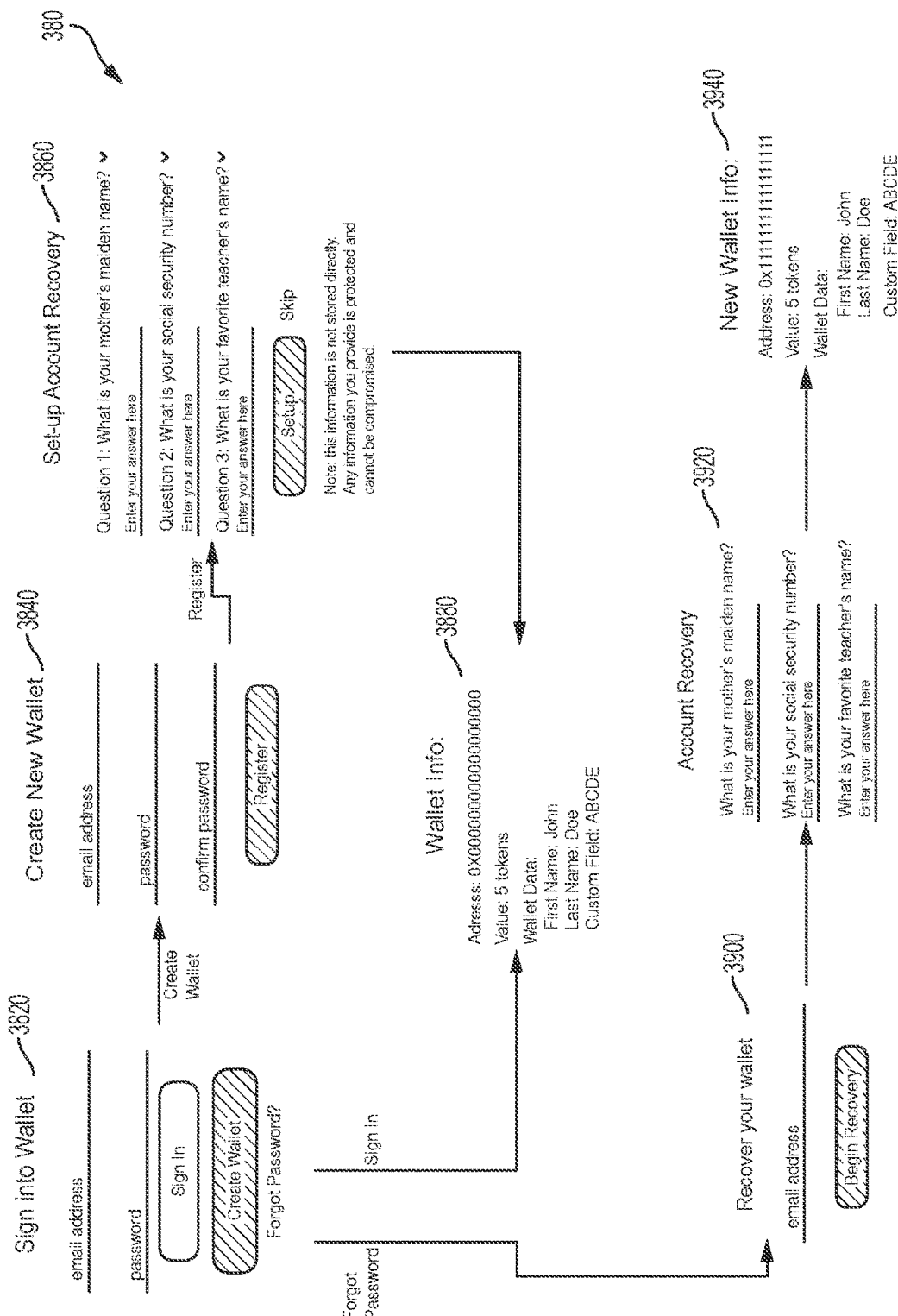
FIG. 3D is a diagram of a user interface in a workflow for private key recovery using user-specified known information, according to an example embodiment.

FIGS. 3C-3D are diagrams of a process 360 and interface 380 for private key and data recovery using user-specified known information, according to an example embodiment.

As an initial matter, a user sets up an account on the key recovery computing system as described, for example, in reference to FIG. 3A. As part of the account set up process, the user may sign into/create a new account (or wallet) as shown at 3820 and 3840 of FIG. 3D. If the user attempts to sign in at 3820 and does not have an account, a form similar to form 3840 is rendered to the user, where the user may enter his user ID (e.g., a random string, a user-selected string, email address, etc.) and password to register. At 3860, the user is presented with a form 3860, where the user may provide additional recovery information, such as answers to secret questions. In some embodiments, this step is optional.

At 3880, after successfully creating a new account and/or successfully signing in, the user is provided with the wallet information 3880. Wallet information 3880 includes, for example, the address of the blockchain wallet/blockchain transaction, its value, and/or wallet-related data, such as identifying information (e.g., the first name of the user, the last name of the user, etc.).

Referring to FIGS. 3C-3D, steps 3620-3790 of FIG. 3C and 3900-3940 of FIG. 3D show an example recovery method and user interface, respectively, when known information, such as recovery information entered using the form 3860, is used to recover the account.

Referring now to FIG. 3C, at 3620, the user ID is obtained from the user. One example embodiment of a user interface is shown at 3900 of FIG. 3D, where the user provides his email address to recover the account.

Referring to FIG. 3C, at 3660-3670, user answers to the security questions (matching those previously answered at 3860 of FIG. 3D during account setup) are collected. One example embodiment of a user interface is shown at 3920 of FIG. 3D, where the user provides answers to a plurality of security questions.

Referring to FIG. 3C, at 3720, a private key hashing function is applied to the user ID and the security question answers. In some embodiments, the combination of inputs (e.g., concatenated cleartext data) are hashed using a non-invertible function such as PBKDF2 or Argon2. In some embodiments, the key length is the size of a private key on the specified blockchain (32 bytes for Ethereum™) and formatted accordingly ("Ox" appended for Ethereum™). The output of 3720 is a recovery private key for a blockchain address, which may be derived from or using the recovery private key.

At 3740, a blockchain transaction containing an encrypted password hash created during account setup is fetched using the address derived at 3720 and an optional transaction ID. In some embodiments, the transaction containing the encrypted password hash is the only transaction sent to the address associated with the recovery key such that no transaction ID is necessary. In some embodiments, a transaction ID is generated. The transaction ID may reference the transaction containing the password hash of the user in its data field and may be stored in a trusted central database to enhance the digital record documenting account recovery. The transaction is fetched from the blockchain according to a suitable transaction access method, which may depend on the blockchain platform underlying the key recovery computing system. In some embodiments, the transaction and/or portions thereof (such as various data elements) are encrypted. In some embodiments, the encryption is accomplished using the user's recovery private key.

At 3760, the recovery private key of 3720 and an encrypted data element of the transaction fetched at 3740 serve as inputs to a decryption algorithm, which may be an inversion of a symmetric algorithm used to encrypt the data element. The output is the original password hash created during account setup.

At 3780, a private key hashing function is applied to the outputs of 3760 and 3620 (the original password hash and the user identifier, respectively) to generate the original key.

At 3790, the blockchain transaction(s) signed using the original key are identified. These transactions may be presented to the user via an example form 3940 of FIG. 3D. In some embodiments, the user is prompted for a new password and the transactions are moved to a new address associated with a new private key, which in turn is associated with the new password. For example, the user may be prompted for a new password at 3640. At 3680, a new account may be created. In some embodiments, the new account is created as described in reference to FIGS. 2A, 3A, and/or 4A. At 3700, a new private key is generated using a hash of the user ID and a hash of the new password provided at 3640. The hash of the new password or the new private key is used to sign the blockchain transactions previously signed using the original key.

In some embodiments, the blockchain address of the original transaction is derived from the recovery private key. A transaction is constructed containing a data field set to the Encrypted Data type. The recipient of the transaction is set to the address derived from the recovery key. The transaction is cryptographically signed and broadcast. In some embodiments, encrypted data is sent to a third party via an Internet protocol, such as http, https, etc. The third party broadcasts the transaction to the user's derived address on behalf of the user from a third-party wallet (thus picking up transaction fees).

Once both the original address, the original private key and the new private key are known, the new address is derived from the new private key generated at 3700. The process further comprises decryption any data stored in transactions on the old address and encrypting it with the new private key. Data is sent in individual transactions from old address to new address. Any token assets are sent from the old address to the new address. In some embodiments, the data encrypted with the new private key is sent to a third party and handled as described in reference to FIGS. 5A-6B.

Figure 3E:
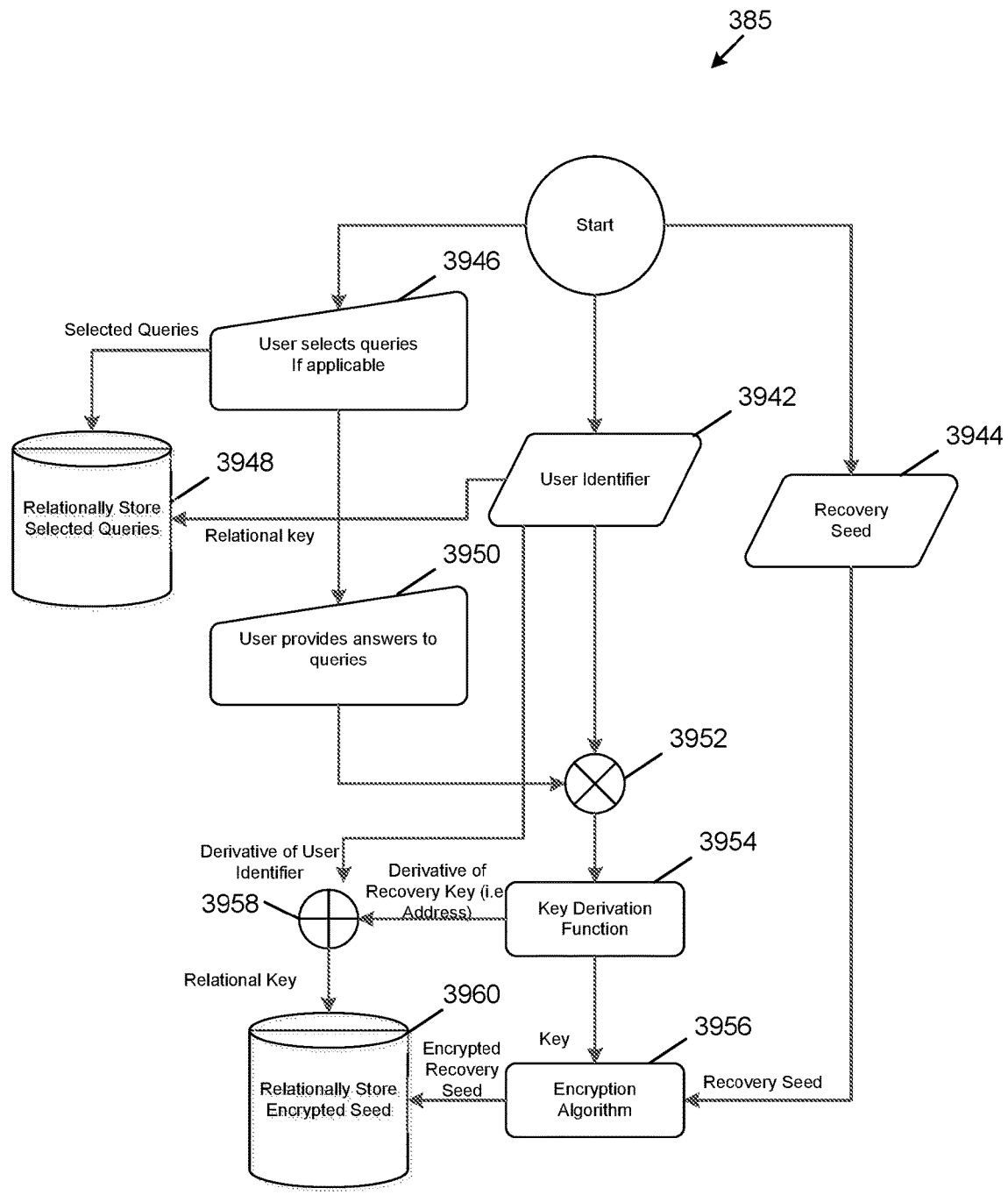
FIG. 3E is a diagram of yet another example of account setup using known information, according to an example embodiment.

FIG. 3E is a diagram of yet another example of account setup using known information, according to an example embodiment. Referring to FIG. 3E generally, the known information embodiment of the setup process involves querying the user for information that is feasibly reproducible by the user exclusively and using this information to create an alternative private key and/or associated blockchain account to store the user's recovery seed securely. Information that could be feasibly used includes but is not limited to security/challenge question answers, a combination of personal identification information such as SSN, driver's license, or passport numbers, and preference information whereby a user is presented a sequence of arbitrary choices where the result of their cumulative choices is used to create their new private key. A derivative of the user's provided information (optionally associated with the user's account identifier) is used to create the user's recovery private key. To have a high degree of resolution and entropy, substantial data must be collected to prevent automated malicious reproduction, phishing, or guessing of the required information.

To secure the user's recovery seed, it is encrypted with the generated recovery key. The encrypted recovery seed is then stored relationally with respect to either the account identifier or derivative of the recovery key-pair (i.e. address) in a trusted central database, blockchain transaction, or on a device owned by the user. A record of the information required (i.e. challenge questions) is stored using one of these methods as well. Should a third party store the encrypted recovery seed on behalf of the user, the stored information may be access-controlled to require 2-factor authentication.

At 3942, the user supplies a user identifier. At 3946, the user selects the queries and/or enters custom queries. At 3948, the queries are stored relationally to the user identifier provided at 3942. The information may be stored in a relational database, on the blockchain, or in another suitable storage medium. At 3950, the user provides answers to the queries selected and/or entered by the user. At 3952, the user identifier and the provided answers are sent to a key derivation function, which, at 3954, produces a recovery key. In some embodiments, the recovery key includes an address of the blockchain transaction where assets are stored. At 3956, the recovery seed received at 3944 is encrypted using the recovery key and the encrypted recovery seed is sent to a storage entity. At 3958, the system generates a derivative (such as a hash) of the user identifier and sends it, together with the address, to the storage entity. At 3960, the storage entity stores the encrypted recovery seed relationally to the derivative of the user identifier or to the address.

Figure 3F:
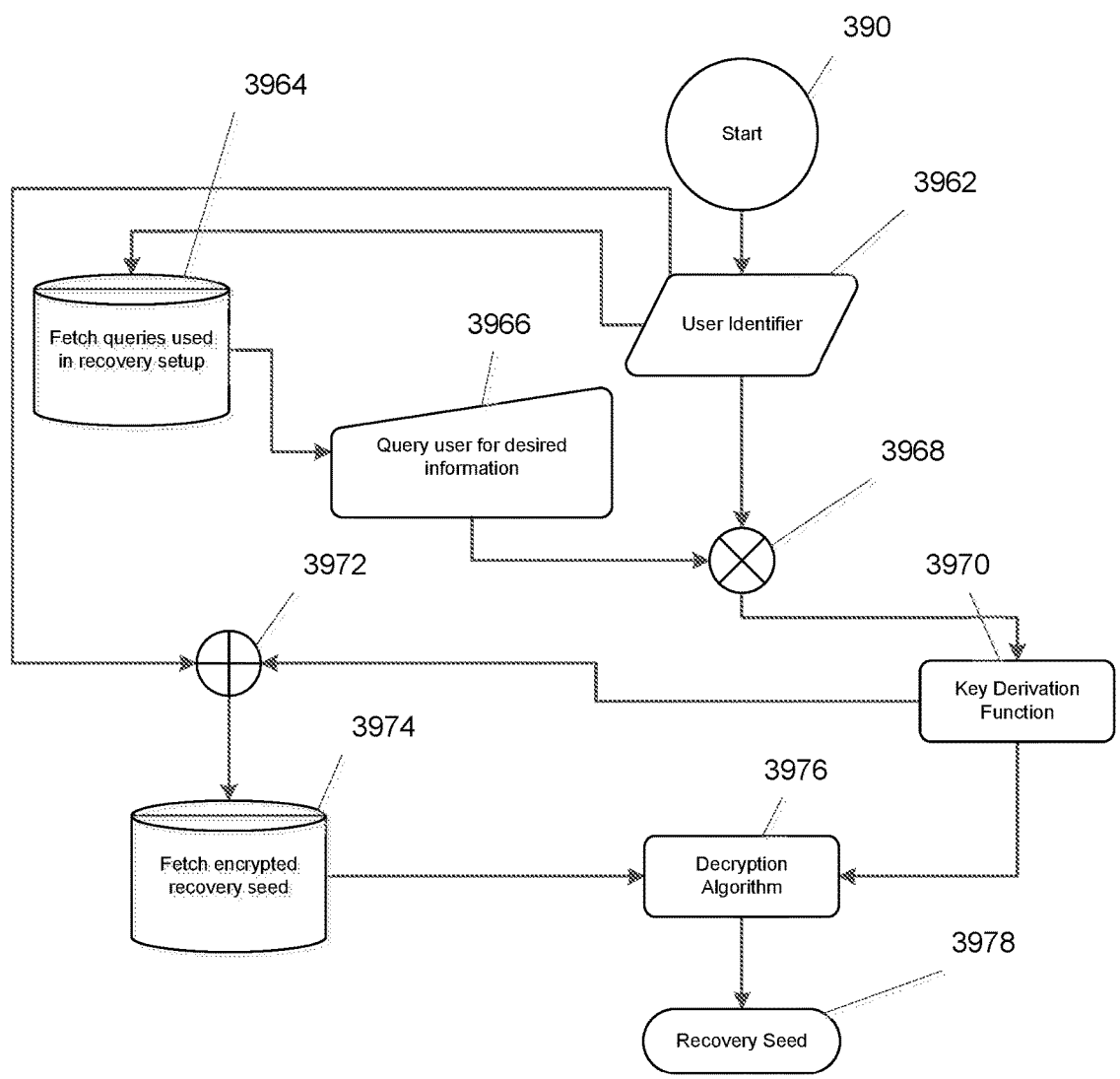
FIG. 3F is a diagram of an example method of account recovery using known information of FIG. 3E, according to an example embodiment.

FIG. 3F is a diagram of an example method of account recovery using known information of FIG. 3E, according to an example embodiment. Referring to FIG. 3F generally, this process requires that the user can successfully reproduce the same information offered in the account setup process. Given the correct information, the recovery private key can be recreated via the methods discussed in the recovery setup process. After retrieving a user's encrypted recovery seed and/or after the user is verified by a second factor, the recovery seed can then be decrypted using the recovery key.

At 3962, a user supplies a user identifier. At 3964, the user identifier is used as a relational key to fetch the queries used in the account setup process of FIG. 3E. At 3966, the user is queried, through a user interface, for desired information and provides responses, which are evaluated at 3968. If the responses match the previously provided responses, then at 3970, a key derivation function is applied to the provided answers to generate a recovery key. In some embodiments, the recovery key is an address.

At 3972, the recovery key, address or the user identifier is sent to a relational database that stores an encrypted recovery seed. At 3974, the encrypted recovery seed is retrieved from the database based on a look-up process using the recovery key, address or the user identifier, which are stored relationally to the encrypted recovery seed. At 3976, a decryption algorithm is applied to the encrypted recovery seed to decrypt the encrypted recovery seed using the recovery key derived at 3970. At 3978, the recovery seed is produced.

IV. Technologies for Private Key Recovery Using an Electronic Notification

Figure 4A:
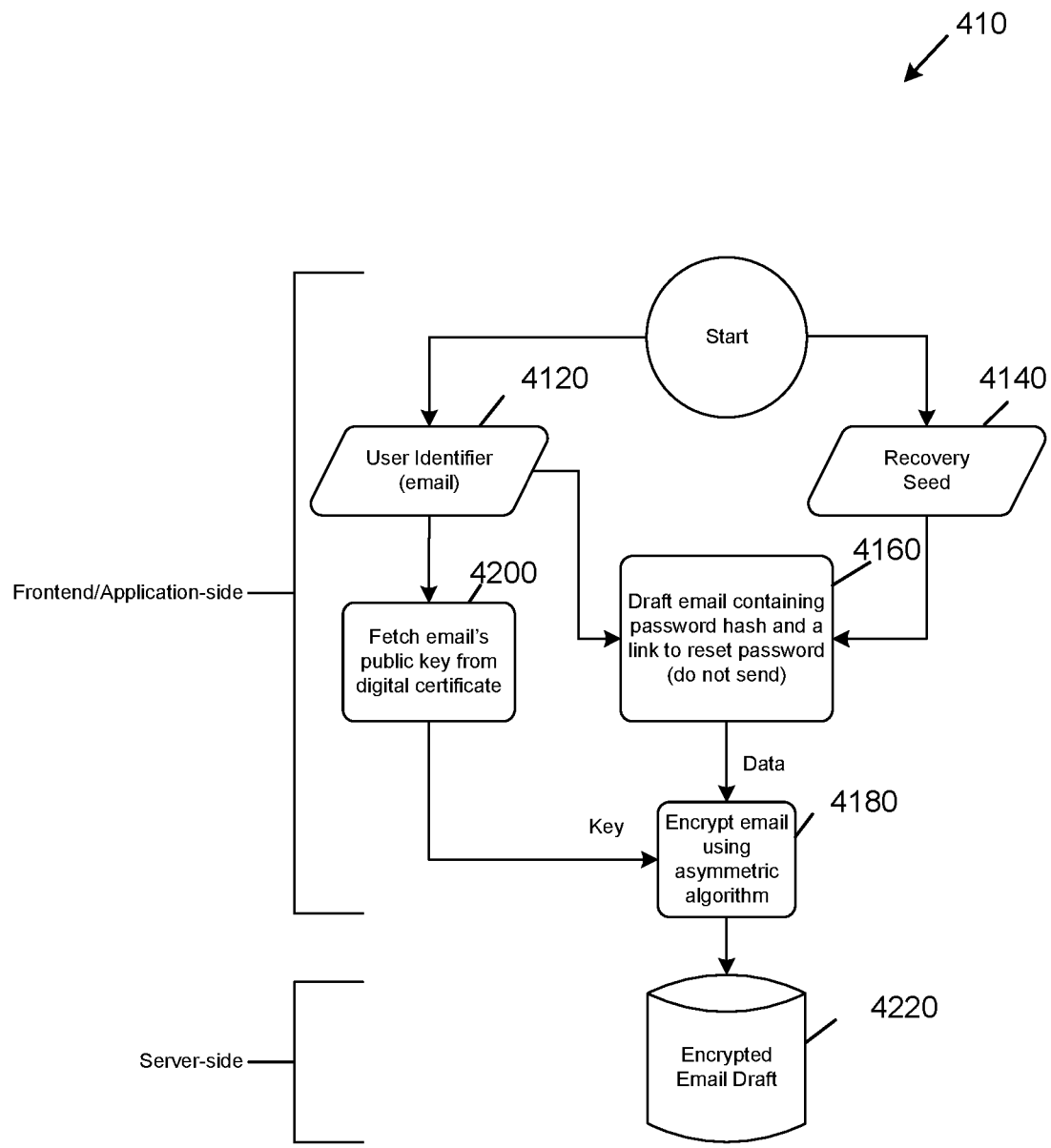
FIG. 4A is a diagram of a process for account setup using notification-based private key recovery, according to an example embodiment.

FIG. 4A is a diagram of a process 410 for account setup using notification-based private key recovery in blockchain systems, according to an example embodiment. Accounts may be recovered through notifications delivered to the user via email, SMS/text message, etc. In the embodiment of FIG. 4A, email recovery is discussed. Referring to FIG. 4A generally, the email/SMS recovery embodiment includes an email provider that offers digital certificates, such as S/MIME, or a mobile device application offering PGP SMS or similar for asymmetric encryption of messages. In this instance, a user's email address or phone application have an associated public key. To leverage public key for secure account recovery, the user's recovery seed is inserted as plain text into an email/text message draft that instructs the user on how to use the recovery seed to recover the user's account. In an example embodiment, the instructions point the user to supply the recovery seed to a secure application in order to reset the user's account. The email draft may be encrypted asymmetrically, using the public key of the email address/mobile device application, at which point, only the respective private key can successfully decrypt the message. The email draft may be stored in a trusted central database relationally with respect to the user's account identifier for later use.

At 4120, a user ID (here, the user's email address) is received. At 4140, the user's recovery seed is received and/or generated. In some embodiments, the user's recovery seed is a hash of user-supplied information, such as the user ID. In some embodiments, as shown, the recovery seed is a hash of the user's password.

At 4160, a draft email message (e.g., a template) is created. Some email recovery embodiments include using digital certificates such as S/MIME for asymmetric encryption. In this instance, a user's email address will have an associated public key. To leverage the public key infrastructure for secure recovery of a blockchain-based account, the user's recovery seed of 4140 is inserted as plain text into an email draft that instructs the user on how to recover the account. The output of 4160 provides the data (email message) to be encrypted using an asymmetric encryption algorithm.

At 4200, the public key is fetched from the email account's digital certificate. The output of 4200 provides the key to be used for encryption of the email draft at 4180.

At 4180, the email draft is encrypted using an asymmetric encryption algorithm. In some embodiments, the email draft is encrypted using the email address's public key, at which point only the email address's private key can successfully decrypt the notification.

At 4220, the email draft is stored in non-volatile memory associated with or accessible to the key recovery computing system. In some embodiments, the email draft may be stored in a trusted central database for later use. In some embodiments, the central database is part of or is connected to an email server. In some embodiments, the email draft is stored on a blockchain as a smart contract by the key recovery computing system and/or the application. In some embodiments, the encrypted email draft is stored relationally to the user identifier provided at 4120.

In embodiments using SMS-based notifications rather than email, the process 410 may be implemented using SMS as the communication method by which a public key infrastructure such as PGP SMS is leveraged in place of the example S/MIME protocol of the email embodiment.

Figure 4B:
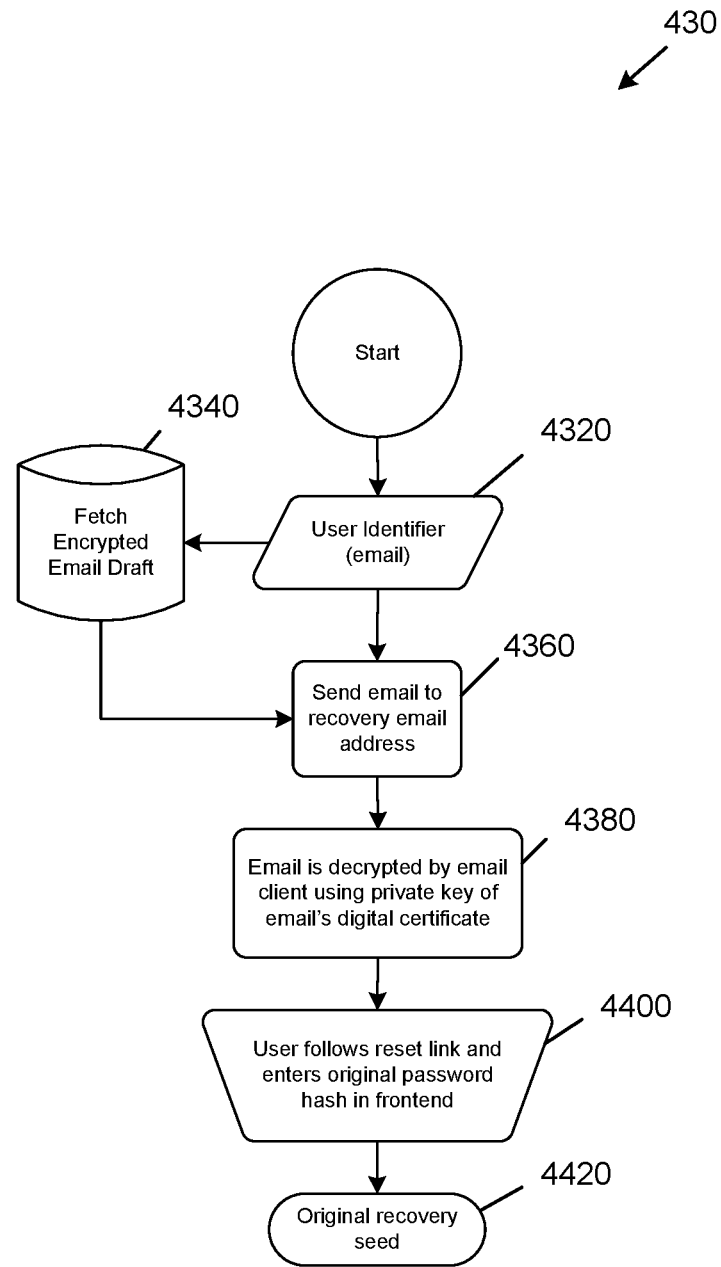
FIG. 4B is a diagram of a process for notification-based private key recovery, according to an example embodiment.
Figure 4C:
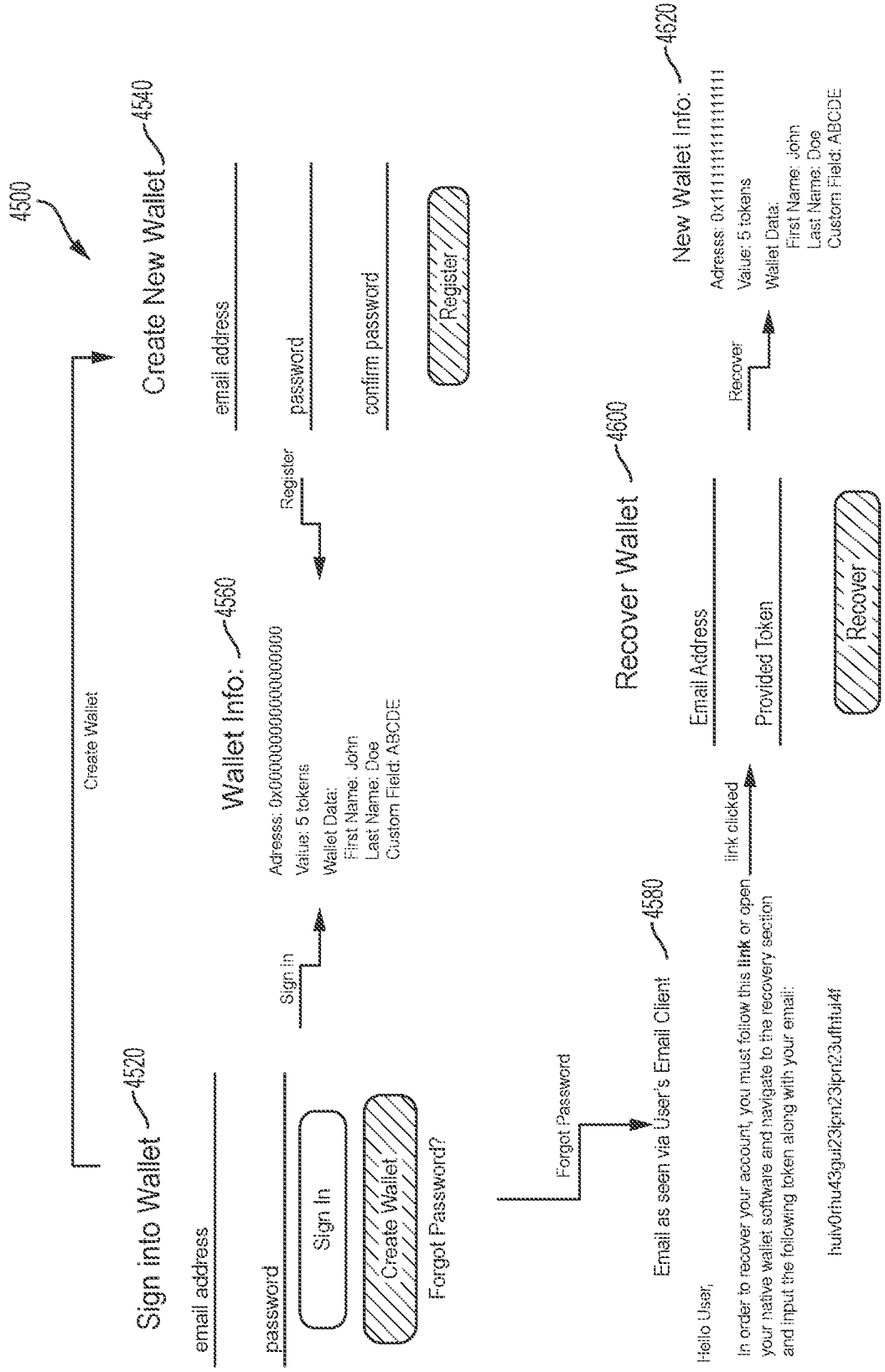
FIG. 4C is a diagram of a user interface in a workflow for notification-based private key recovery, according to an example embodiment.

FIG. 4B-4C are diagrams of a process 430 and user interface 450 for notification-based private key recovery, according to an example embodiment.

As an initial matter, a user sets up an account on the key recovery computing system as described, for example, in reference to FIGS. 3A-4A. As part of the account set up process, the user may sign into/create a new account (or wallet) as shown at 4520 and 4540 of FIG. 4C. If the user attempts to sign in at 4520 and does not have an account, a form similar to form 4540 is rendered to the user, where the user may enter his user ID (here, an email address, phone number, etc.) and password to register.

At 4560, after successfully creating a new account and/or successfully signing in, the user is provided with wallet information. Wallet information of 4560 includes, for example, the address of the blockchain wallet/blockchain transaction, its value, and/or wallet-related data, such as identifying information (e.g., the first name of the user, the last name of the user, etc.).

Referring to FIGS. 4B-4C, steps 4320-4420 of FIG. 4B and 4580-4620 of FIG. 4C show an example recovery method and user interface, respectively, when a notification, such as an email sent using a draft generated as described in FIG. 4A, is used to recover the account.

Upon receiving a user's request to reset the user's password provided at 4320 (using, for example, form 4520 of FIG. 4C), the encrypted recovery email draft 4580 corresponding to the user is fetched from a database at 4340 and sent to the user's email address at 4360.

At 4380, the user's email client, holding the private key to their digital certificate, decrypts the email containing the user's password hash in plaintext. As shown in the example form 4580 of FIG. 4C, the notification may direct the user to follow a link to the application's recovery site with the password hash attached as a URL parameter.

At 4400, GUI functionality is provided for the user to follow the link. In some embodiments, the user is instructed to enter the password hash/recovery seed manually for increased security instead of or in addition to following the link.

At 4420, the user's recovery seed is recovered. As shown in the example forms 4600-4620, the original recovery seed may be used to retrieve account information.

V. Technologies for Enhanced Custodial Private Key Recovery

Figure 5A:
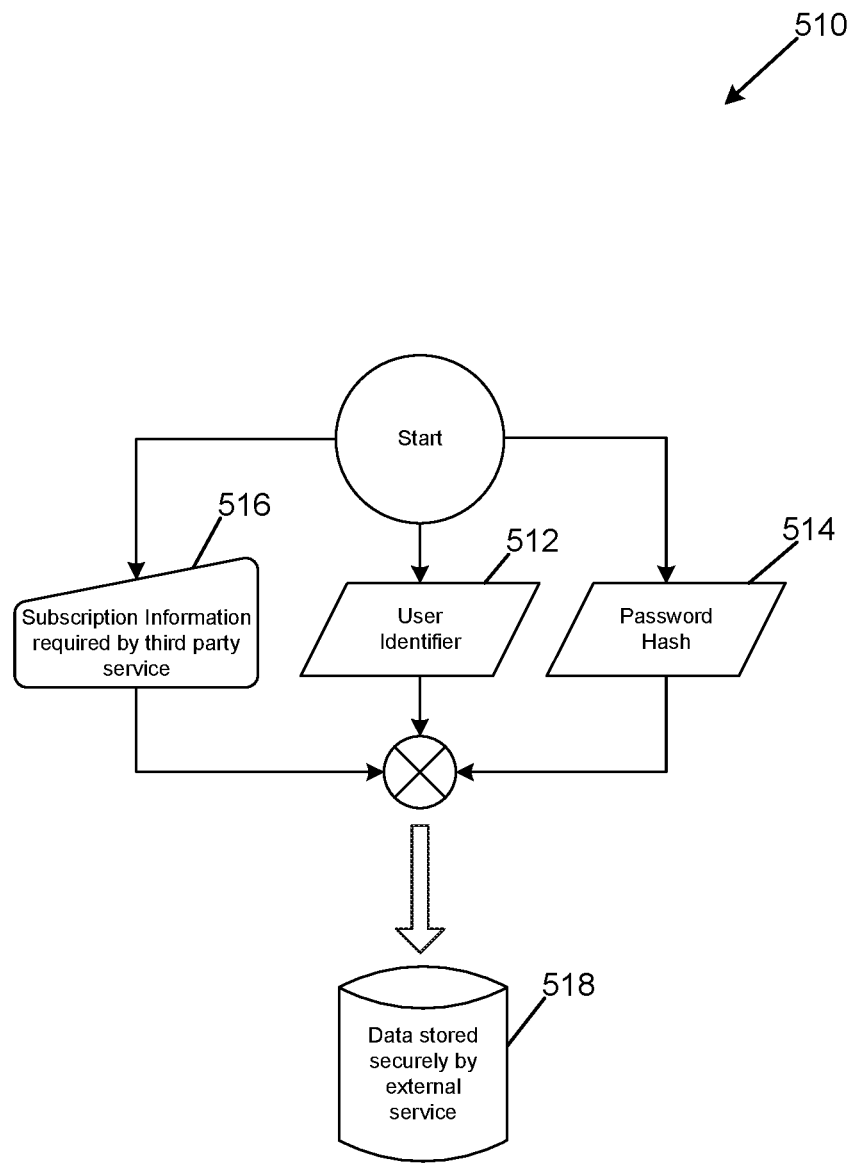
FIG. 5A is a diagram of a process for account setup that enables custodial private key recovery, according to an example embodiment.
Figure 5B:
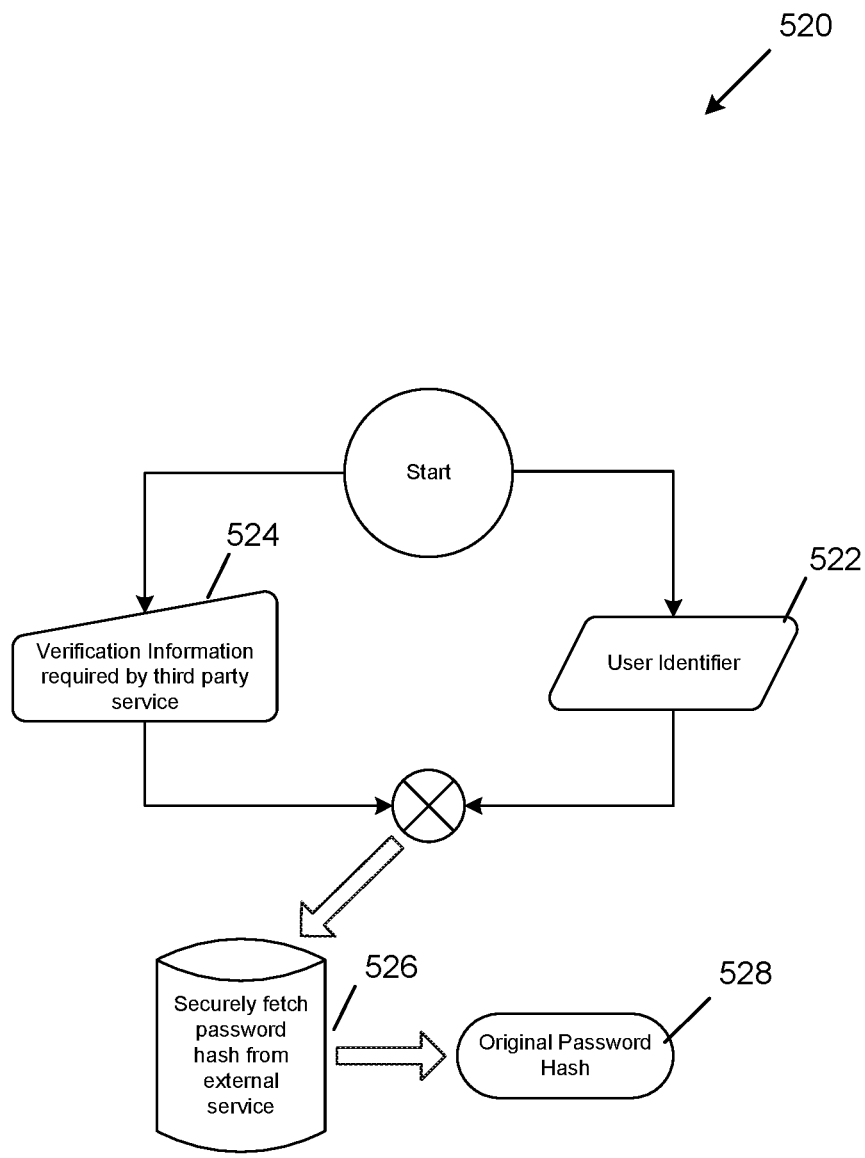
FIG. 5B is a diagram of a process for custodial private key recovery, according to an example embodiment.

FIGS. 5A and 5B are diagrams of the process 510 for account setup that enables custodial private key recovery process 520 in blockchain systems, according to an example embodiment. In some embodiments, the custodial recovery process 520 involves a trusted third party storing user credentials, such as the password hash or another recovery seed.

Referring to FIG. 5A, in a custodial system where the custodial service holds the user's password hash (obtained from the user at 514) and the user's ID (obtained from the user at 512) obtains and any subscription (authentication) information required by the service (obtained from the user at 516). The subscription information is sent (for example, through an API which may make use of http, https, or another secure protocol) by the key recovery computing system to the custodial service to be stored at 518. The subscription information of 516 may include security question answers, user preferences, etc. Alternatively, the service may choose to require the use of biometrics including but not limited to fingerprint, palm print, retina scan, facial imaging, voice pattern, gait, or behavior. The service may use one or multiple of the following in order to create a template for each user: feature extraction algorithms, input sensors (i.e. optical, capacitance, etc.), modes (face, fingerprint, etc.), and biometric samples from the user. The resulting template is stored to later identify and authenticate users wishing to retrieve their password. Tokenized versions of the required subscription information may be used for increased security. In some embodiments, all or some of the computer-based functionality of the service is implemented on the key recovery computing system 180 of FIG. 1C such that the operator of the key recovery computing system is the operator of all or some of the computer-based functionality of the service. In some embodiments, all or some of the computer-based functionality is managed by the key recovery computing system 180 through the computing device of the user. For example, the computing device of the user may include the input device(s) for collecting biometric information, tokenizing information, etc.

Referring to FIG. 5B, the password hash recovery process in a custodial system requires that the user reproduce the information used when subscribing to the service. For example, the user may provide the user ID (at 522) and the subscription information collected at 516 of FIG. 5A (at 524). The service would deem this a successful authentication and securely return the original password hash to the application. In the event that the service requires biometric information and/or other non-deterministic authentication information, the service may construct a template for the user as discussed above. The template can be compared against the templates of other subscribed users. A similarity or match score may be assigned to each template pair. Should the service find a match score above an acceptance threshold, the password hash corresponding to that template will be released at 526 to retrieve the original password hash at 528. In some embodiments, functionality is available to minimize the false acceptance and false rejection rates during the template comparison process.

Figure 6A:
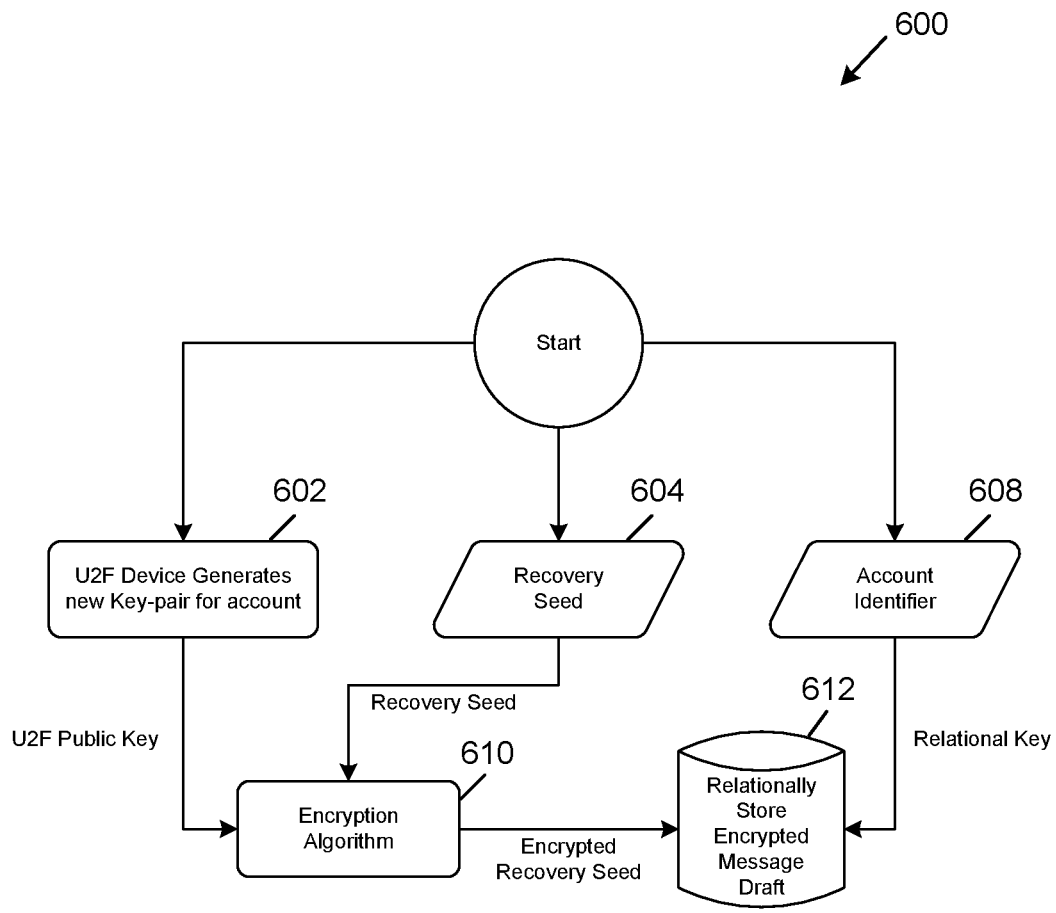
FIG. 6A is a diagram of a process for account setup that enables private key recovery using a Universal $2^{nd}$ Factor (U2F) authentication system, according to an example embodiment.

VI. Technologies for Private Key Recovery Using Universal Second Factor (U2F) Authentication FIG. 6A is a diagram of a process for account setup that enables private key recovery using a Universal $2^{nd}$ Factor (U2F) authentication system, according to an example embodiment. Referring to FIG. 6A generally, a Universal Second Factor device, not limited to a FIDO U2F key, may be used in the recovery setup process. An example U2F device (e.g., a token, a security key), comprises processor and/or a memory and connects with auxiliary systems via USB, near-field communications, Bluetooth, or another suitable protocol.

In the embodiment of FIG. 6A, at 602, the U2F device generates and stores, internally, a new key pair for the user's account. Only the public key of the key pair is exposed to other devices. At 604, a recovery seed is received from the user or via an API. At 608, the computing system receive an account identifier, such as an account address, is received. Steps 602-608 are performed or directed by the key recovery computing system 180 of FIG. 1C.

At 610, the recovery seed is encrypted, asymmetrically, with the public key of the U2F device via a connected device, not limited to a smart phone, laptop, tablet, hardware wallet or another device, such as a mobile device. At 612, the encrypted seed is stored relationally with respect to the account identifier in a trusted central database, a blockchain transaction, or on a device owned by the user. In embodiments where a third-party stores the encrypted recovery seed on behalf of the user, the encrypted recovery seed may be access-controlled to require 2-factor authentication.

Figure 6B:
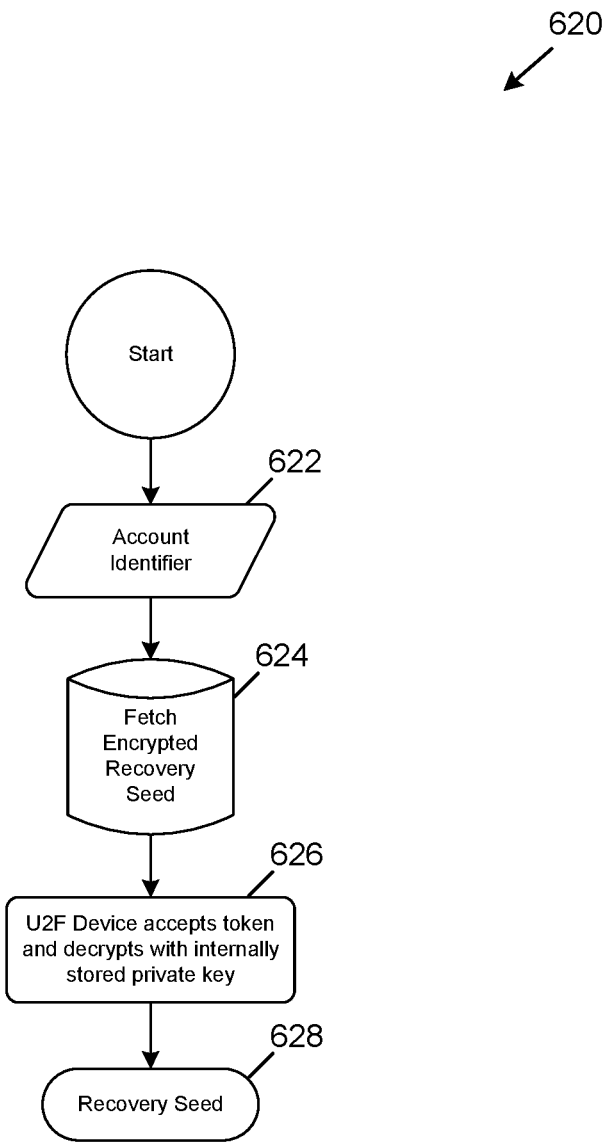
FIG. 6B is a diagram of a process for account recovery that enables private key recovery using a Universal $2^{nd}$ Factor (U2F) authentication system, according to an example embodiment.

FIG. 6B is a diagram of a process for account recovery that enables private key recovery using a Universal $2^{nd}$ Factor (U2F) authentication system, according to an example embodiment. This method requires that the user have access to the same U2F device used during the recovery setup process. After retrieving a user's encrypted recovery seed from its stored location (assuming the user is verified by a second factor if required), the recovery seed can then be passed to the U2F device and decrypted, asymmetrically, by the private key stored, internally, in the device and returned to the device of origin without ever exposing the private key stored in the U2F device.

At 622, an account identifier is received. At 624, the encrypted recovery seed is fetched from a database using the account identifier. At 626, the encrypted recovery seed is sent to the U2F device, which decrypts the encrypted recovery seed using an internally stored private key. At 628, the recovery seed is recovered.

VII. User Interface Components for Private Key Setup and Recovery

FIGS. 7A-7G are diagrams of example user interfaces for various aspects of account setup and recovery using technologies for private key recovery in blockchain-based systems; according to example embodiments. As described herein, the example user interfaces may comprise various interactive elements, including text fields, buttons, drop-down boxes, etc.

Figure 7A:
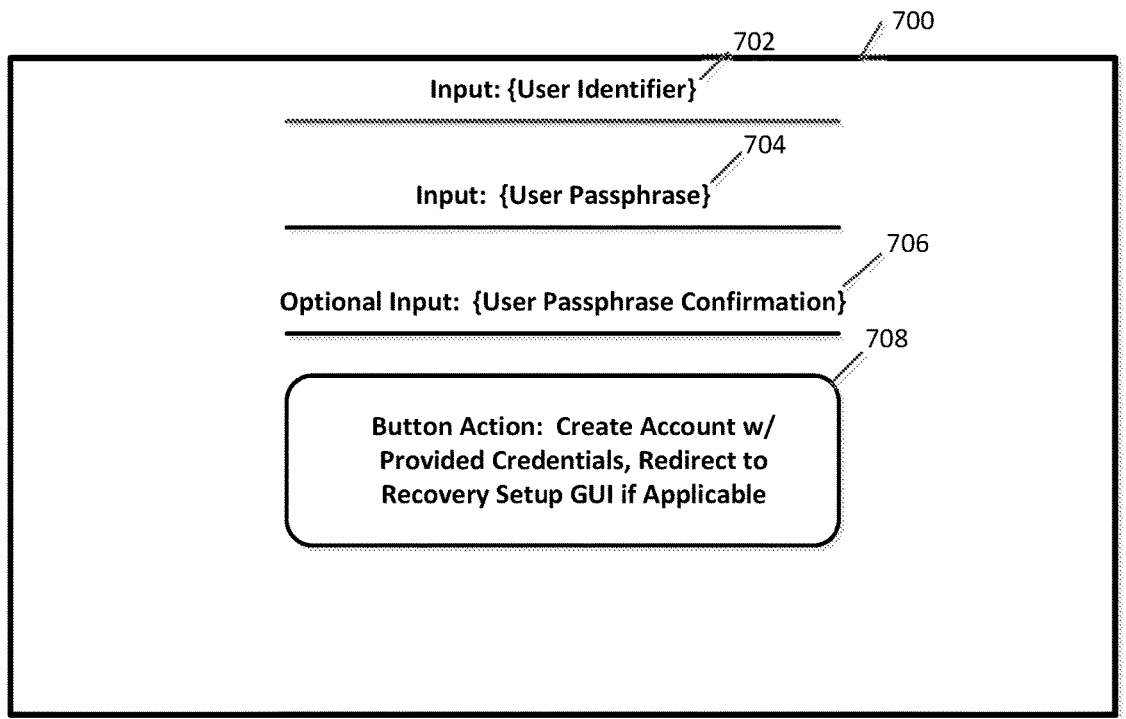
FIGS. 7A-7G are diagrams of example user interfaces for various aspects of account setup and recovery using technologies for private key recovery in blockchain-based systems, according to example embodiments.

FIG. 7A shows an example GUI 700 for an account setup process, where the user is prompted for a user identifier 702 and password 704. The GUI 700 is configured to display a password confirmation at 706 and to provide a button 708 that, upon detecting user interaction, executes code for account creation.

Figure 7B:
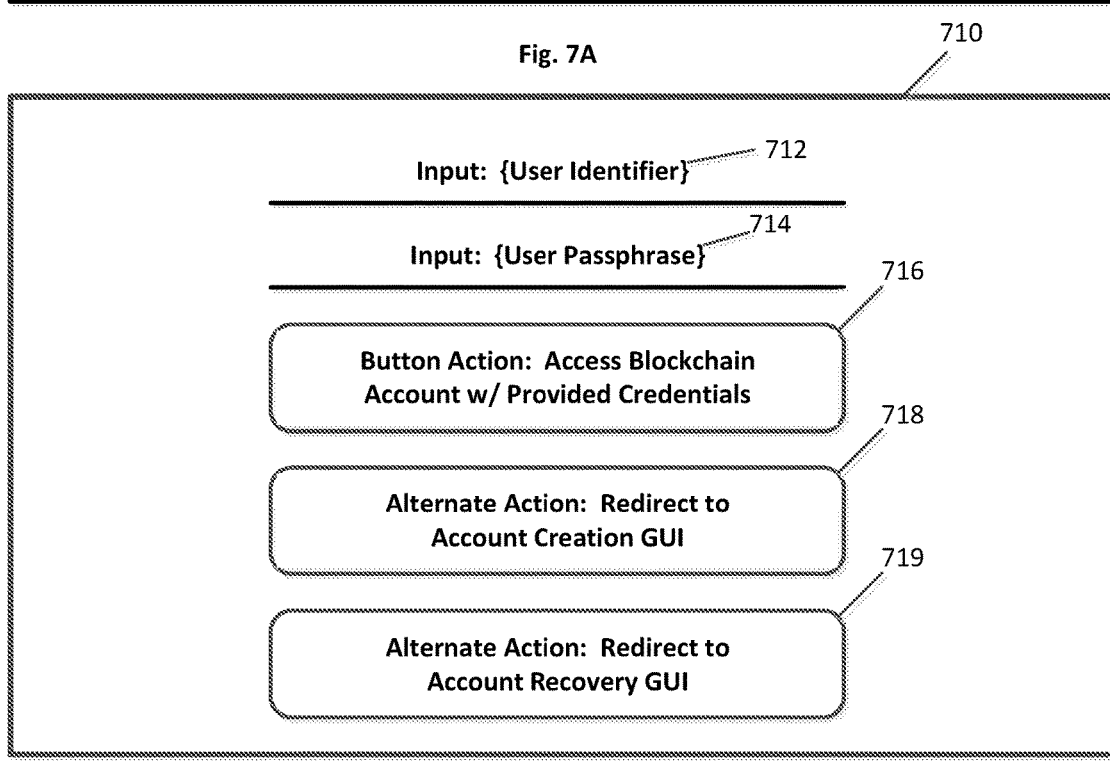

FIG. 7B shows an example GUI 710 for an account access process, where the user is prompted for a user identifier 712 and password 714. The user may access a blockchain account with these credentials (at 716), be redirected to an account creation GUI (at 718) or be redirected to an account recovery GUI (at 719).

Figure 7C:
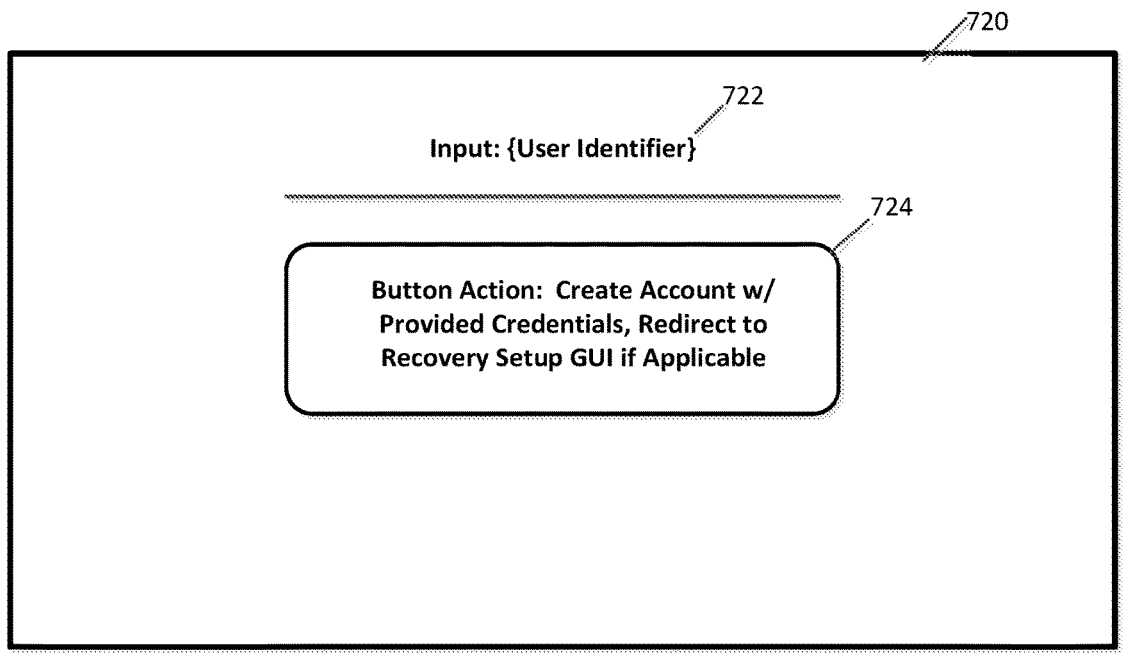

FIG. 7C shows an example GUI 720 for an account recovery process, where the user is prompted for a user identifier 722. The recovery process is initiated at 724 responsive to detecting a user interaction.

Figure 7D:
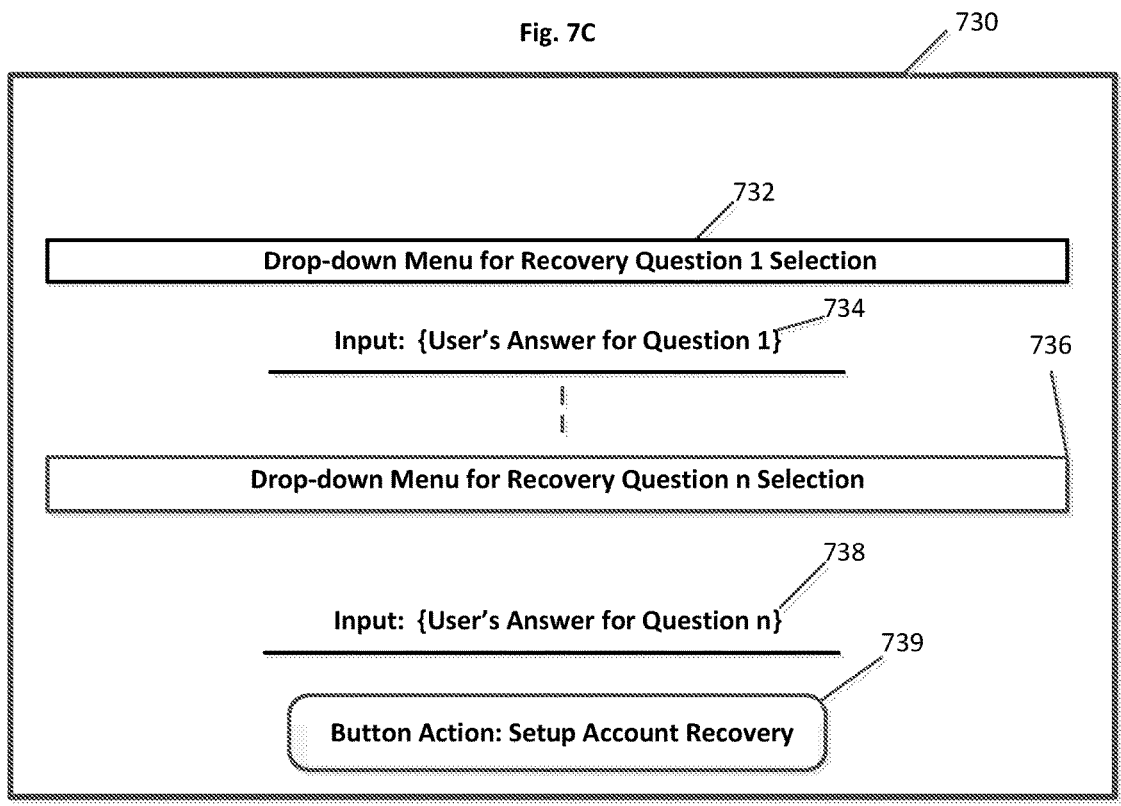

FIG. 7D shows an example GUI 730 for an account setup process using known information, where the user is prompted to select security queries and provide corresponding answers (at 732-738). The account setup process is initiated at 739 responsive to detecting a user interaction.

Figure 7E:
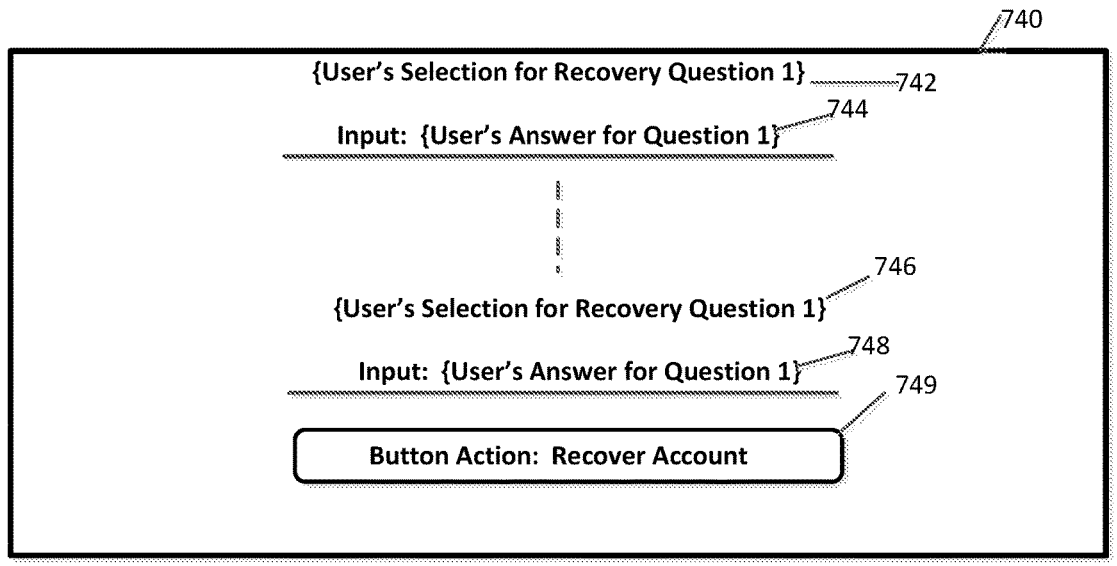

FIG. 7E shows an example GUI 740 for an account recovery process using known information, where the user is prompted to select security queries and provide corresponding answers (at 742-748). The recovery process is initiated at 749 responsive to detecting a user interaction.

Figure 7F:
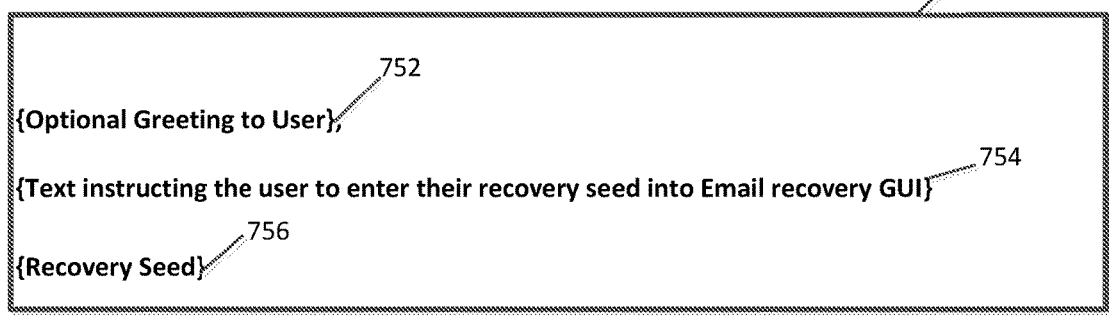
Figure 7G:
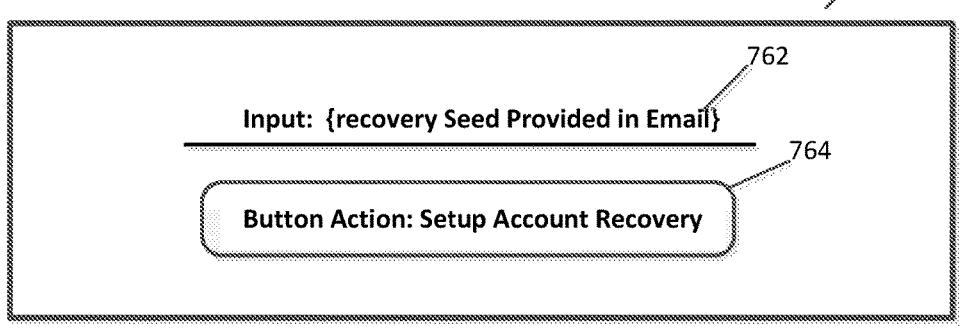

FIG. 7F shows an example GUI 750 for an account recovery message using a notification, where the user is provided with a message containing a recovery seed 756.

FIG. 7D shows an example GUI 760, where the user is prompted to enter the recovery seed 762 to initiate the account recovery process at 764 responsive to detecting a user interaction.

The features of the present disclosure which may specifically refer to embodiments of the present invention as applied to the management of electronic messages apply with equal force to more generalized embodiments of systems and methods for applying game mechanics to the completion of tasks. For example, systems and methods for deferring action on tasks are contemplated by the present disclosure in similar fashion as described in the context of deferring action on electronic messages. The various embodiments for determining scores in the context of managing electronic messages are also contemplated in the context of completing tasks. The various embodiments for timing a user's selection of an action to be applied to an electronic message are also contemplated in the context of the completion of tasks by users. Each and every feature and element of the present disclosure as described in the context of managing electronic messages is contemplated in the context of completing tasks.

It is understood by those skilled in the art that, unless expressly required, the steps of the various methods described herein need not be performed in any particular order.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program", "software", "application", or "circuit" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A networked computing system for private key recovery in distributed ledger systems, the system comprising:
    at least one memory to store processor-executable instructions; and
    at least one processor communicatively coupled to said at least one memory, wherein upon execution of the processor-executable instructions, the system:
        provides an original private key, wherein the original private key is associated with a storage location of a blockchain-based asset;
        receives supplemental recovery information provided by a user via a user computing device;
        derives a recovery seed from at least a subset of the supplemental recovery information, wherein the recovery seed is non-invertible;
        stores, in a data storage entity, the original private key and the recovery seed relationally to the supplemental recovery information;
        generates a recovery notification containing the recovery seed; and
        associates the recovery notification with a target address that is not included in the subset of the supplemental recovery information used to generate the recovery seed.

2. The system of claim 1, wherein the system further cryptographically protects at least one of the original private key and the recovery seed.

3. The system of claim 1, wherein the supplemental recovery information comprises at least one of a user-specified identifier, a user-specified password, a plurality of user-specified answers to a plurality of user-specified secret questions, and digitized biometric information of the user.

4. The system of claim 1, wherein the supplemental recovery information comprises subscription information received from an account security service; and wherein the at least one processor is further configured to retrieve user-specified recovery information from the account security service.

5. The system of claim 1, wherein the at least one processor is further configured to:
    provide to the user the recovery notification containing the recovery seed.

6. A method for recovery of private keys in distributed ledger systems, the method comprising:
    providing an original private key, wherein the original private key is associated with a storage location of a blockchain-based asset;
    receiving supplemental recovery information provided by a user via a user computing device;
    deriving a recovery seed from at least a subset of the supplemental recovery information;
    storing, in a data storage entity, the original private key and the recovery seed relationally to the supplemental recovery information;
    generating a recovery notification containing the recovery seed; and
    associating the recovery notification with a target address that is not included in the subset of the supplemental recovery information used to generate the recovery seed.

7. The method of claim 6, further comprising cryptographically protecting at least one of the original private key and the recovery seed.

8. The method of claim 7, further comprising
    causing a universal second-factor authentication (U2F) device to generate a public-private key pair and internally store a U2F private key of the public-private key pair in response to detecting a connection between the user computing device and the U2F device; and
    cryptographically protecting at least one of the original private key and the recovery seed using a U2F public key of the public-private key pair.

9. The method of claim 8, wherein the recovery seed is a first recovery seed, the method further comprising:
    receiving a copy of the supplemental recovery information from the user computing device;
    deriving a second recovery seed from at least a subset of the copy of the supplemental recovery information;
    obtaining a data set from the data storage entity where the first recovery seed matches the second recovery seed;
    extracting the original private key from the data set;
    responsive to detecting a connection between the user computing device and the U2F device, causing the U2F device to decrypt the original private key; and
    based on a decrypted original private key, determining the storage location of the blockchain-based asset.

10. The method of claim 8, wherein the recovery seed is a third recovery seed, the method further comprising:
    receiving a copy of the supplemental recovery information from the user computing device;
    deriving a fourth recovery seed from at least a subset of the copy of the supplemental recovery information;
    obtaining a data set from the data storage entity where the supplemental recovery information matches the copy of the supplemental recovery information;
    extracting the third recovery seed from the data set, wherein the third recovery seed is encrypted;
    responsive to detecting a connection between the user computing device and the U2F device, causing the U2F device to decrypt the third recovery seed;
    responsive to verifying that a decrypted third recovery seed matches the fourth recovery seed, extracting the original private key from the data set; and
    based on the original private key, determining the storage location of the blockchain-based asset.

11. The method of claim 6, wherein the supplemental recovery information comprises a user-specified identifier and the recovery seed comprises a hash of the user-specified identifier.

12. The method of claim 6, wherein the supplemental recovery information comprises a user-specified password and the recovery seed comprises a hash of the user-specified password.

13. The method of claim 6, wherein the supplemental recovery information comprises a plurality of user-specified answers to a plurality of user-specified secret questions; and wherein the recovery seed comprises a hash of the plurality of user-specified answers.

14. The method of claim 6, wherein the supplemental recovery information comprises digitized biometric information of the user.

15. The method of claim 6, wherein the supplemental recovery information comprises subscription information received from an account security service; and wherein the method further comprises retrieving user-specified recovery information from the account security service.

16. The method of claim 6, further comprising providing to the user the recovery notification containing the recovery seed.

17. The method of claim 6, wherein the recovery notification is at least one of an email message and an SMS message.

18. The method of claim 6, further comprising:
augmenting user-specified recovery information with a system-generated random number.

19. The method of claim 6, wherein the recovery seed is a fifth recovery seed, the method further comprising:
receiving a copy of the supplemental recovery information;
deriving a sixth recovery seed from at least a subset of the copy of the supplemental recovery information;
obtaining a data set from the data storage entity where the fifth recovery seed matches the sixth recovery seed;
extracting the original private key from the data set;
based on the original private key, determining the storage location of the blockchain-based asset.

20. The method of claim 19, further comprising:
receiving new supplemental recovery information;
providing a new private key, wherein the new private key is associated with a new storage location;
deriving a new recovery seed from at least a subset of the new supplemental recovery information, wherein the new recovery seed is non-invertible;
storing, in the data storage entity, the new private key and the new recovery seed relationally to the new supplemental recovery information; and
associating the blockchain-based asset with the new storage location.

\* \* \* \* \*